United States Patent [19]
Scarangella et al.

[11] Patent Number: 5,942,996
[45] Date of Patent: Aug. 24, 1999

[54] APPARATUS AND METHOD ENABLING UNIMPEDED COMMUNICATION BETWEEN DIFFERENT CLASSES OF EQUIPMENT UTILIZING DIFFERENT BYTE PROTOCOLS

[75] Inventors: Anthony Thomas Scarangella, Hillsdale, N.J.; Alfonso R. Rojas, Congers, N.Y.

[73] Assignee: Ascom Timeplex Trading AG, Bern, Switzerland

[21] Appl. No.: 08/726,584

[22] Filed: Oct. 7, 1996

[51] Int. Cl.[6] ...................................................... H03M 7/00
[52] U.S. Cl. ............................ 341/95; 341/100; 341/101; 341/63; 341/50
[58] Field of Search .............................. 341/95, 100, 101, 341/63, 102, 50

[56] References Cited

U.S. PATENT DOCUMENTS

| | | | |
|---|---|---|---|
| 3,079,597 | 2/1963 | Wild | 340/347 |
| 4,675,652 | 6/1987 | Machado | 340/347 |
| 5,081,654 | 1/1992 | Stephenson | 375/106 |
| 5,192,950 | 3/1993 | Stephenson | 341/100 |
| 5,428,627 | 6/1995 | Gupta | 371/37.1 |

FOREIGN PATENT DOCUMENTS

0390309  10/1990  European Pat. Off. .

*Primary Examiner*—Marc S. Hoff
*Attorney, Agent, or Firm*—Irwin Ostroff; Edward Brandeau

[57] ABSTRACT

Apparatus and method are provided for enabling unimpeded, clock-to-clock communication between different classes of equipment including converting without queuing of data parallel bytes of digital data having a given number of binary bits to parallel bytes having a different (greater or smaller) number of bits. Converting of bytes is accomplished by momentarily storing as current data and as remainder data respective bits of successive incoming bytes clock count by clock count; identifying within each count a desired number of bits stored as remainder data, or current data, or both and grouping them into a set of bits to be outputted as an outgoing byte during a respective count; outputting such sets of bits clock count by clock count as outgoing bytes such that the outgoing bytes each have a different number of bits versus the number of bits in each incoming byte, and the outgoing bits have a desired numerical sequence; and periodically compensating for the total number of bits outputted versus the number inputted during a given period of time. After each conversion of the bytes in a data stream the converted bytes are momentarily stored in a buffer memory (phasor) which provides for timing flexibility as the bytes of data are transferred to other locations.

9 Claims, 14 Drawing Sheets

APPARATUS AND METHOD ENABLING UNIMPEDED COMMUNICATION BETWEEN DIFFERENT CLASSES OF EQUIPMENT UTILIZING DIFFERENT BYTE PROTOCOLS

FIELD OF THE INVENTION

This invention relates to apparatus and method for converting, at high speed, without queuing of data, and with high accuracy, bytes of digital data having a given number of binary bits as employed by one class of equipment to bytes having a different (greater or smaller) number of bits as employed by another class of equipment. Such conversion is necessary in order to make possible unimpeded communication between the two classes of equipment.

BACKGROUND OF THE INVENTION

More than a decade ago the Ascom Timeplex Company developed and introduced to a world-wide market high speed data transmission equipment under the tradename LINK/2™. This equipment enabled a user, such as a bank, insurance company, etc., having offices at different locations (e.g., New York and London) to transmit virtually instantly and in a highly cost effective way volumes of data between locations. The LINK/2™ equipment has proven to be very efficient and highly cost effective. As a result it has achieved great customer acceptance and captured a large share of the market all over the world. It is estimated that the value of the existing installed base of LINK/2™ equipment is now over a billion dollars.

At the time the LINK/2™ was being developed it was decided to utilize a 9-bit byte in its operating protocol. An extra, or 9th binary bit, was added to 8 "data" bits in each byte in order to signify whether the byte represented a "function" or user data.

In recent years there have been important advances in technology relating to data transmission, particularly with regard to new semiconductor devices, increased speed of the devices and of communication links, much higher density of integrated circuits, better costs, and so forth. Ascom Timeplex, in order to take advantage of this new technology developed and recently introduced to the market a new class of equipment under the tradename "Synchrony™". Because of factors which did not exist earlier when LINK/2™ was developed, the new Synchrony™ equipment is designed to operate with an 8 bit per byte protocol.

A customer who buys the new Synchrony™ equipment may already be using LINK/2™ equipment. It is therefore highly desirable for maximum utility of both systems that they be able to transmit data back and forth to each other in unimpeded fashion. But because the Synchrony™ equipment operates with bytes of 8 bits in length versus 9-bit bytes for the LINK/2™ equipment, effective, high speed communication between the new and the old equipment has posed a difficult problem.

In order to provide for unimpeded communications between LINK/2™ and Synchrony equipments, a module termed a "link gateway module" (LGM) can be added to the Synchrony™ equipment. The LGM in its various operations (not otherwise discussed herein) processes data in the form of 9-bit bytes as employed by LINK/2™ and data in the form of 8-bit bytes as employed by Synchrony™. A critical need of the LGM therefore is the ability to convert bytes having a given number of bits into bytes having a different number of bits. At various stages in its operation the LGM needs to convert from 9-bit bytes to 8-bit bytes, to convert from 8-bit bytes to 9-bit bytes, and also to convert from 9-bit bytes to 7-bit bytes, to convert from 7-bit bytes to 9-bit bytes and to convert from 7-bit bytes to 8-bit bytes. Of course the various conversions must be done with absolute accuracy virtually instantaneously without queuing of data, and in a cost-effective way.

The present invention provides a simple, cost effective, and highly efficient solution to the problem of converting data existing in the form of bytes of a given bit length to equivalent data in the form of bytes having a different bit length (either greater or smaller).

SUMMARY OF THE INVENTION

In a specific illustration of the present invention a Link/2™ unit, utilizing a 9-bit per byte protocol, is enabled to communicate back and forth in unimpeded fashion with a Synchrony™ unit, which uses an 8-bit per byte protocol. This is accomplished by providing the Synchrony™ unit with a link gateway module (LGM) which contains a plurality of converters also embodying features of the invention. These converters convert in real time without queuing of data, bytes from 9 to 7 bits, bytes from 8 to 8 bits, as well as bytes from 9 to 7 bits, bytes from 7 to 9 bits and bytes from 7 to 8 bits. Specific details of such converters are disclosed hereinafter.

Associated with each converter is a "phasor" (buffer memory) which momentarily stores the bytes of data after they have been converted to a different bit count. Each such phasor provides for timing flexibility in the transfer of bytes of data from a respective converter to other portions of a unit of equipment, such as to another converter, or to another location. Thus, for example, a data stream can be transmitted in real time with virtually no delay from a Link/2™ unit to a Synchrony™ unit, (i.e., one provided with an LGM) where the bytes of the data are immediately converted from 9 to 8 bits, then after passing through a phasor immediately reconverted from 8 to 9 bits and thereafter transmitted in proper format to a Link/2™ unit. In this way a group of Link/2™ units and a group of Synchrony™ units are interconnected in a global network in which any unit (Link/2™ or Synchrony™) can communicate with any other unit or units in unimpeded fashion.

Viewed from one apparatus aspect, the present invention is directed to apparatus enabling unimpeded communication of data bytes clock-to-clock between different classes of equipment utilizing different byte protocols. The apparatus comprises first group of units of a first class of equipment utilizing bytes of "m" number of bits in its operating protocol; a second group of units of a second class of equipment utilizing bytes of "n" number of bits in its operating protocol; a plurality of byte converters associated with one or more of the units for converting clock-to-clock and without queuing bytes of "m" bits to bytes of "n" bits, and for similarly converting bytes of "n" bits to bytes of "m" bits; means for coupling bytes outputted from each converter to a respective buffer memory phasor thereby providing flexibility in timing as the converted bytes are transmitted to other locations; and communication links coupling units in the first and second groups together such that the groups of units of both classes are connected in a global network in which any unit can communicate unimpeded in real time with any other unit or units.

Viewed from an other apparatus aspect, the present invention is directed to apparatus enabling unimpeded communication of data bytes clock-to-clock between and amongst different classes of equipment utilizing different byte protocols. The apparatus comprises: a first group of units of a first class of equipment utilizing bytes of 9 bits in its operating protocol; a second group of units of a second class of equipment utilizing bytes of 8 bits in its operating protocol; a plurality of byte converters associated with one or more of the units of the second class for converting clock-to-clock and without queuing bytes of 9 bits to bytes of 8 bits, and for similarly converting bytes of 8 bits to bytes of 9bits; means for coupling bytes outputted from each converter to a respective buffer memory phasor thereby providing flexibility in timing as the converted bytes are transmitted to other locations; and communication links coupling units in the first and second groups together such that the groups of units of both classes are connected in a global network in which any unit can communicate unimpeded in real time with any other unit or units.

Viewed from a method aspect, the present invention is directed to a method of continually converting in real time incoming parallel bytes having a given number of bits into outgoing parallel bytes having a different number of bits. The method comprises the steps of: momentarily storing clock count by clock count as current data and as remainder data respective bits of incoming bytes each having a given number of bits; selecting clock count by clock count respective ones of bits stored as current data or as remainder data, or both and grouping the bits selected each count into a set having a different number of bits from the number in each incoming byte; outputting clock count by clock count the selected sets of bits as outgoing bytes; periodically compensating for the number of bits outputted versus the number of bits inputted during a given time interval; and transmitted the converted bytes to a buffer memory and from thence to another location.

Viewed from an other method aspect, the present invention is directed to a method of continually converting in real time incoming parallel data bytes into outgoing parallel data bytes. The method comprises the steps of: momentarily storing as current data and as remainder data respective bits of successive incoming bytes clock count by clock count; identifying within each count a desired number of bits stored as remainder data, or current data, or both and grouping them into a set of bits to be outputted as an outgoing byte during a respective count; periodically compensating for the total number of bits outputted versus the number inputted during a given period of time; and outputting such sets of bits to a buffer memory phasor clock count by clock count as outgoing bytes for transmission to another locations such that the outgoing bytes each have a different number of bits versus the number of bits in each incoming byte, and the outgoing bits have a desired numerical sequence.

A fuller understanding of the invention will best be gained from the following detailed description taken in conjunction with the accompanying drawings.

DETAILED DESCRIPTION

Figure 1:
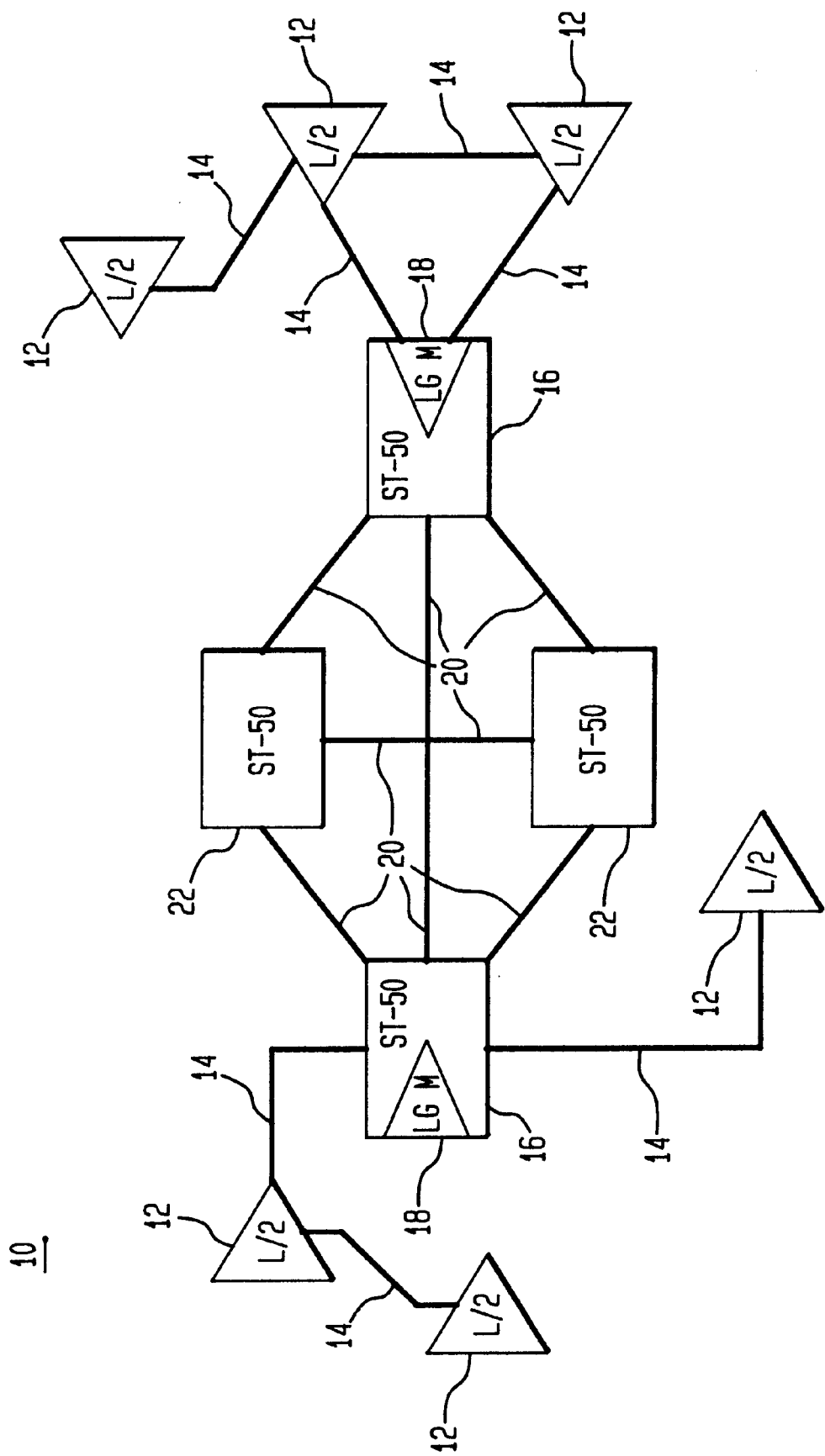
FIG. 1 is a schematic block diagram of an overall network of LINK/2™ stations, operating with a 9-bit per byte protocol, interconnected with "Synchrony™" stations operating with an 8-bit per byte protocol.

Referring now to FIG. 1 there is shown in block diagram form an overall network 10 in which a number of LINK/2™ (L/2) stations (or nodes) indicated at 12 are connected by various high speed data paths (e.g., T-1 lines) 14 to each other and/or to selected ones of Synchrony™ stations (ST-50) indicated at 16. The LINK/2™ stations 12 employ 9-bit bytes in their operation while the Synchrony™ stations 16 employ 8-bit bytes in their operation. The Synchrony™ stations 16 are each provided with a link gateway module (LGM) 18 which facilitates communication to and from the LINK/2™ stations 12 and the Synchrony™ stations 16 in accordance with the present invention. Each LGM 18 employs converters provided in accordance with the present invention. These converters will be described in detail hereinafter. The Synchrony™ stations 16 are connected via high speed data paths 20 (which may be similar to paths 14), to each other and to additional Synchrony™ stations (also ST-50) indicated at 22. The stations 22 are not provided with LGM's 18 because they do not communicate directly with LINK/2™ stations 12. By virtue of the novel converters, employed by the LGMs 18, unimpeded high speed data transfer between LINK/2™ stations 12 and the Synchrony™ stations 16 is made possible even though LINK/2™ equipment operates with a 9-bit per byte protocol and the Synchrony™ equipment operates with an 8-bit per byte protocol.

Figure 2:
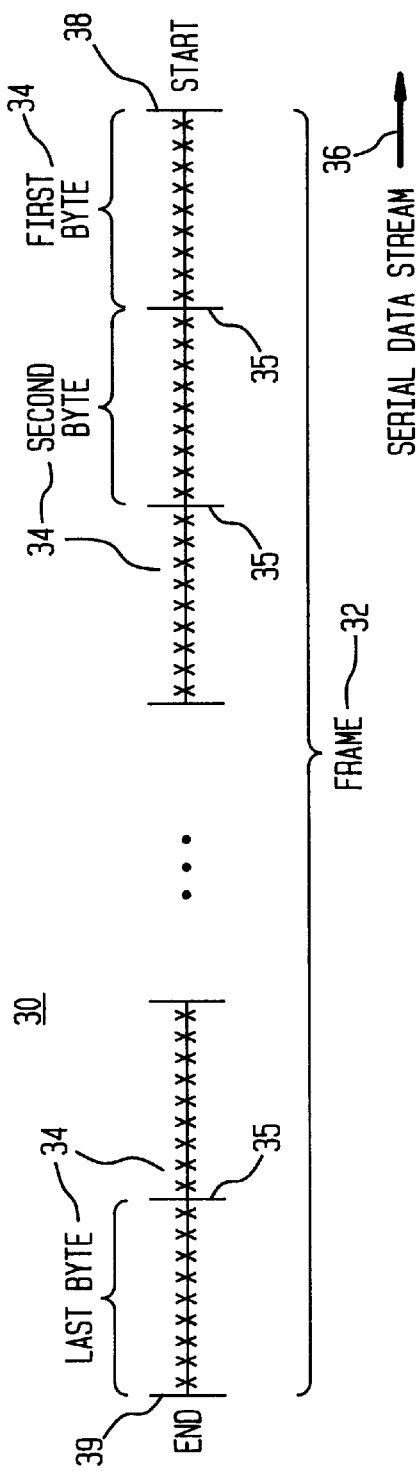
FIG. 2 is a schematic diagram showing how multiple bytes of 9 bits each are arranged serially by a LINK/2™ station into a "frame" for transmission to another LINK/2™ station via a high speed data transmission path, such as a "T-1" telephone data line.

Referring now to FIG. 2, there is shown a schematic diagram 30 of a frame 32 of 9-bit bytes 34 arranged serially by a LINK/2™ station. Each frame 32 is transmitted by the LINK/2™ equipment at high speed (e.g., via a T-1 line which transmits at 1.544 mbs) from one user location to another. Bit positions here are indicated by "x". Each byte 34 is delineated by respective virtual bands 35 between successive bytes. User data, such as computer, telephone and other digital signals to be transmitted by LINK/2™ equipment are compiled by a unit termed a scanner (not shown) within a LINK/2™ and which is well known in the art, and arranged serially as 9-bit bytes within the frame 32. Data bytes are interspersed with bytes of synchronizing signals, operating functions, automatic repeat requests (ARQ's) etc. within the frame 32 in accordance with LINK/2™ communication protocol. There is a fixed number of bytes 34 in a frame 32, and the bytes, which are all of 9-bit length, are transmitted bit-by-bit at precisely clocked intervals as a serial data stream in a direction indicated by an arrow 36. The frame 32 starts at a point indicated at 38, and ends as indicated at 39. There may be one or more frames (not shown) in front of or behind the frame 32.

Figure 3:
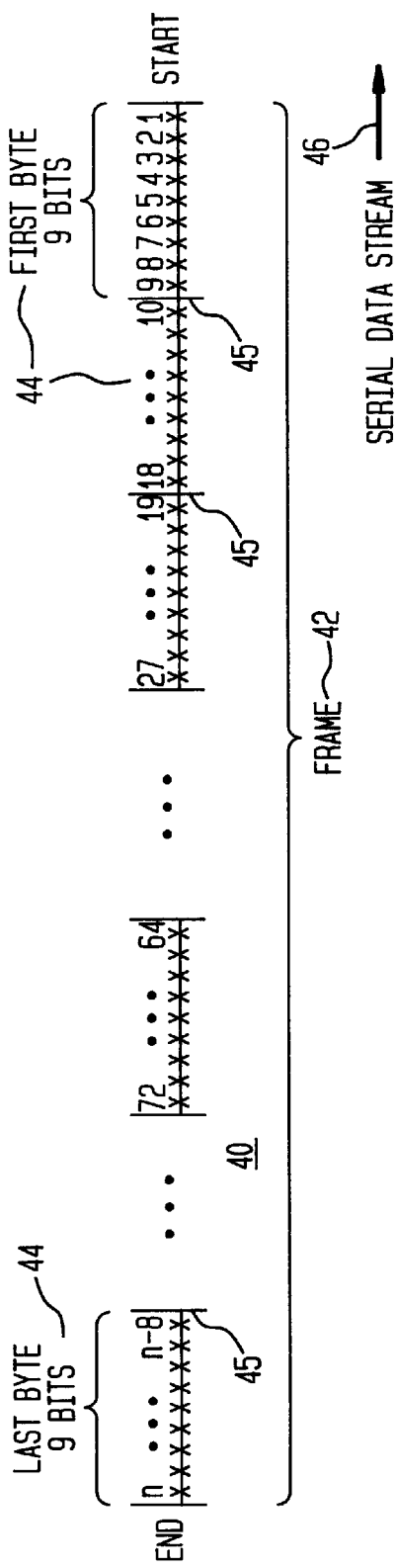
FIG. 3 illustrates how individual bits of the bytes of a frame may be thought of as consecutively numbered 1, 2, 3, etc., to "n", where "n" is the total number of bits in all of the bytes of the frame.

Referring now to FIG. 3 there is shown a schematic diagram 40 of a frame 42 with bytes 44 and bands 45. The frame 42 may be identical to the frame 32 of FIG. 2. Here however, the individual bits, also indicated by "x" are consecutively numbered "1,""2", "3", etc. to "n", where "1" is the first bit in the frame 42 and "n" is the last. The number "n" is the total number of bits in all of the bytes 44 in the frame 42. The bits "x" are transmitted as a precisely clocked serial data stream in the direction of an arrow 46. It is essential for the integrity of the information contained within a frame 42 that not one of bits "1" through "n" be lost, or that it be misplaced in its numerical sequence within the frame 42 after the bytes 44 are converted to bytes with a different bit count. How this is done in accordance with the present invention will be explained in detail hereinafter.

Figure 4:
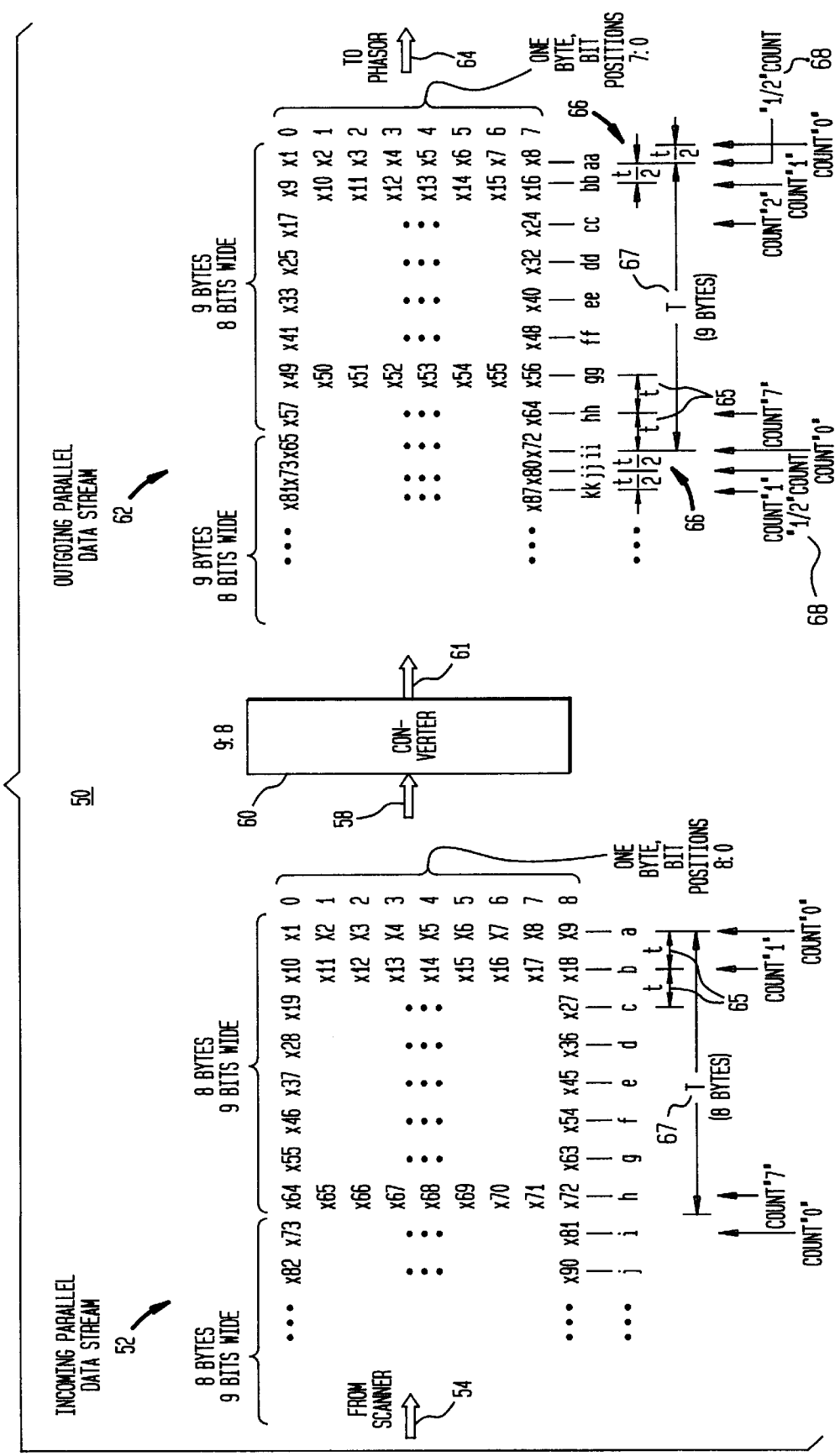
FIG. 4 is a schematic diagram illustrating an incoming data stream of successive bytes, each with 9 bits in parallel, being applied to a nine to eight (9:8) converter, provided in accordance with the invention, where the converter provides an outgoing data stream of successive bytes, each with 8 bits in parallel.

Referring now to FIG. 4, there is shown a schematic diagram 50 illustrating an incoming data stream indicated at 52, a 9 bit to 8 bit (9:8) converter 60 provided according to the invention, and an outgoing data stream indicated at 62. In the incoming data stream 52, successive parallel 9-bit bytes are, by way of example, designated "a", "b", "c", etc. The individual bits, indicated by "x", of each byte are shown consecutively numbered "1", "2", "3", etc. The nine bit positions of each byte are designated "0" through "8" (8:0) as shown. The general expression "(8:0)" is standard digital notation as used to denote that there are 9 individual items in a particular element, such as bits in a byte. A notation "(7:0)" indicates 8 items, and so on. The bytes of the data stream 52 (e.g., bytes "a", "b", etc.) are spaced apart at precisely clocked intervals (defined as "clock-intervals") shown by times "t" indicated at 65. The data stream 52 is transmitted in the direction of an arrow 54 from a scanner (not shown but of a type well known in the art) within an LGM 18 (see FIG. 1) of a Synchrony™ unit 16. The scanner (not shown) re-formats a serial data stream, such as illustrated by the frame 42 of FIG. 3 into the parallel bytes "a", "b", "c", etc., of the incoming parallel data stream 52 of FIG. 4. For the sake of subsequent explanation the respective arithmetic numbers "1", "2", "3", etc., of the bits in the respective bytes in both these serial and parallel data streams are shown the same. Thus the first byte 44 in the frame 42 of FIG. 3 contains bits numbered "1"–"9", the second byte 44 contains bits "10"–"18", and so on. Note that in FIG. 4 the byte "a" (first byte) contains the bits "1"–"9" and occurs at a count "0", the byte "b" (second byte) contains the bits "10"–"18" and occurs at a count "1", and so on. The eight parallel bytes "a" through "h" contain a total of 72 bits and occur on respective counts "0"–"7". A cumulative time "T" indicated at 67, contains these eight incoming bytes. The significance of this will be explained shortly.

The incoming data stream 52 of FIG. 4 is applied byte by byte, as indicated by an arrow 58, to the (9:8) converter 60 provided in accordance with the invention. The converter 60, which will be described in detail hereinafter, virtually instantaneously converts the 9-bit bytes "a", "b", "c" etc. of the incoming data stream 52 to 8-bit bytes which it outputs, as indicated by an arrow 61, as the outgoing data stream 62. The parallel 8-bit bytes "aa", "bb" etc., of the outgoing data stream 62 are applied byte by byte, as indicated by an arrow 64 to a phasor (not shown) which is a buffer memory (well known in the art) for monetarily storing each byte until it is called for during subsequent processing within an LGM 18 (FIG. 1).

The first byte of the outgoing data stream is designated "aa" and corresponds partly but not exactly to byte "a" of the incoming data stream 52. The 8 bits, each indicated by an "x", of the outgoing byte "aa" are numbered "1"–"8". The eight bit positions are designated "0"–"7" (7:0). Note that the 9th bit of the incoming byte "a" is now in bit position "0" of the next outgoing 8-bit byte "bb" of the outgoing data stream 62. The byte "bb" in its respective 8 bit positions now contain bits numbered "9"–"16". Thus by comparing the arithmetic numbers of the bits of the incoming bytes "a", "b", "c" etc. with the arithmetic numbers of the bits in the outgoing data stream 62 it is easily seen in which outgoing bytes "aa", "bb", "cc" etc. and in which bit positions "0"–"7" the respective bits are now found. It is important to note here that no one of the bits arithmetically numbered "1", "2", "3", etc., in the incoming data stream 52 has been lost in the outgoing data stream 62 nor has a bit been misplaced from its original numerical sequence. In other words, if the outgoing data stream 64 were to be reformatted into a serial data stream, the individual bits would have their same respective numbers "1", "2", "3", etc., to "n" as shown in the frame 42 of FIG. 3.

As seen in FIG. 4 the first eight bytes "a" through "h" of the incoming data stream 52 contain 72 bits. It requires the first nine bytes "aa" through "ii" of the outgoing data stream 62 to account for these 72 bits. It is important that there be no cumulative delay or queuing of data into and out of the converter 60. Thus the outgoing nine bytes "aa" through "ii" are outputted from the converter 60 in the same time interval "T" indicated at 67. During the interval "T" the eight incoming bytes "a" through "h" are inputted to the converter 60. The duration of "T" is actually seven "t" plus a half "t", where "t" is a clock-interval indicated at 65.

As will be explained hereinafter, the outgoing byte "aa" is outputted from the converter 60 on a "half-count" indicated at 68 which occurs at a half-clock-interval (t/2) indicated at 66 after a "0" count. The interval between the byte "aa" and the next byte "bb" is also "t/2". A full time "t", representing a full clock-interval 65, exists between outgoing bytes "bb", "cc", etc., to "ii" as shown. Note also that after the nine outgoing bytes "aa"–"ii" (containing a total of 72 bits), the tenth or next byte "jj" with bits numbered "73"–"80", is outputted on a half-count 68 occurring another half-clockinterval 66 (t/2) after a count "0". Thus a next cycle of nine outgoing bytes is repeated, and so on. Each outgoing byte "aa", "bb", "cc", etc. is immediately transferred to a phasor, as was explained previously.

Figure 5:
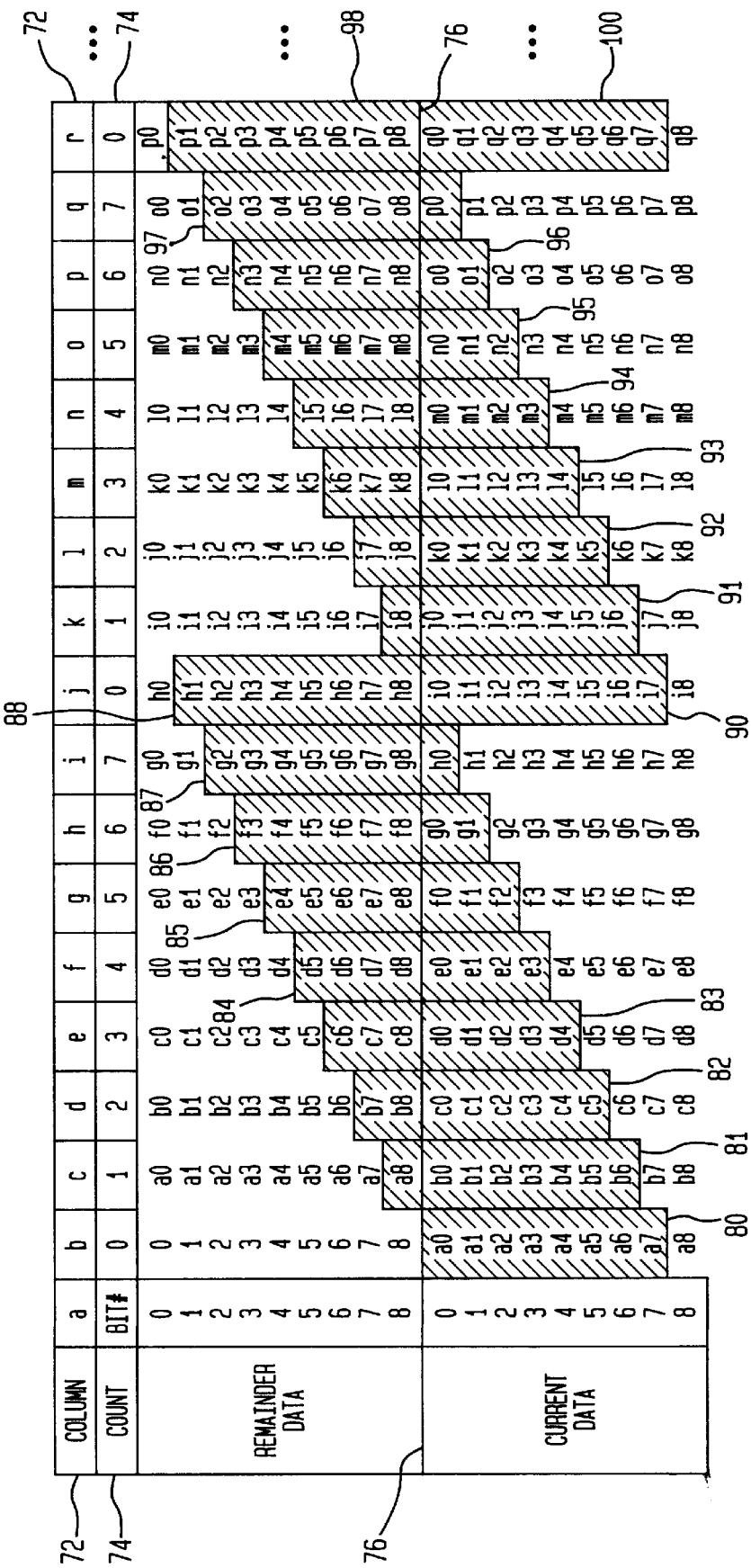
FIG. 5 is a bit chart representing a sequence of incoming 9-bit bytes being converted by the converter of FIG. 4 into a sequence of outgoing 8-bit bytes.

Referring now to FIG. 5, there is shown a bit chart 70 which illustrates graphically how incoming 9-bit bytes are instantly converted by the (9:8) converter 60 clock count by clock count (clock to clock) into outgoing 8-bit bytes. This bit chart 70 is easily understood from the schematic diagram 50 of FIG. 4 as will now be explained. The chart 70 of FIG. 5 is arranged in vertical columns designated by headings "a", "b", "c", etc. in a top horizontal row indicated at 72. Beneath this row is another row indicated at 74, showing successive counts "0"–"7", and then repeating column by column. These count numbers represent the decimal equivalents of respective three-bit binary counts, as is well known. A "half-count" 68 (after a half-clock interval 66 of FIG. 4) is not shown here though, in fact, there occurs a half-count 68 after each count "0", as will be explained hereinafter.

An upper half of column "a" of the chart 70 designates bit positions "0"–"8" of the respective bits of a 9-bits byte. Similarly a lower half of the column "a" shows bit positions "0"–"8" of respective bits of a 9-bit byte. An upper portion of the chart 70 is designated "remainder data" and is separated by a horizontal line 76 from a lower portion designated "current data". It is to be understood that the bit chart 70 may continue to the right beyond a column "r", which is the last one shown here.

Referring now to the lower portion of the chart 70 (which is designated "current data"), column "b" reading successively downward shows alpha-numeric designations "a0" through "a8" corresponding to the respective bit positions "0"–"8" of column "a". The alpha-numeric designations "a0"–"a8" are to be understood as representing respective bit positions of an initial 9-bit byte corresponding to the incoming byte "a" (FIG. 4). The next column "c" of the chart 70 of FIG. 5 under "current data" reads "b0" through "b8" and corresponds to the incoming byte "b" (FIG. 4). In similar fashion column "d" of chart 70 under "current data" shows "c0" through "c8" and represents the incoming byte "c" (FIG. 4) and so on. Thus the incoming bytes "a", "b", "c", etc., are represented in the bit chart 70 of FIG. 5 column by column to the right across the lower half (current data portion) of the chart 70 with "q0"–"q8" being the last positions shown here. Note that an incoming byte "q" is not actually shown in FIG. 4.

In the upper portion of the chart 70 of FIG. 5 labeled "remainder data" the alpha-numeric designation "a0" through "a8" is to be found reading downward in the upper half of the column "c". This is a shift to the right by one column (i.e., from column "b", lower half, to column "c" upper half) of the designation "a0" through "a8". Similarly, remainder data "b0" through "b8" is found in the upper half of the column "d", and so on column by column to the right across the upper portion of the chart. The reason for this shift to the right by one column of the "remainder data" designations will be explained in detail hereinafter.

It is noted that the upper portion of the column "b" of the chart 70 has no alphabet letter designation of the bit positions "0" through "8". It is assumed, for the sake of explanation, that the incoming byte "a" of FIG. 4 is the first data presented to the converter 60. Hence, this byte "a" is represented in column "b" the chart 70 of FIG. 5 under "current data". Incoming byte "a" occurs at the beginning of a count "0".

It is seen in FIG. 4 that only the first eight bits (numbers "1"–"8") of the first incoming 9-bit byte "a" are used in the first outgoing 8-bit byte "aa". Thus, in FIG. 5 column "b" of the chart 70 only the first 8 bits "a0" through "a7" (obtained from the incoming byte "a") are included within a first shaded area 80. This shaded area 80 may therefore be understood as corresponding to the first outgoing byte "aa" of FIG. 4.

As is shown in FIG. 4, a half-count interval 66 (t/2) after a count "0" the first 8 bits ("a0" through "a7") of the incoming 9-bit byte "a" are outputted by the converter 60 as the first outgoing 8-bit byte "aa" (also represented by the shaded area 80 of FIG. 5). In the chart 70 of FIG. 5, the bit "a8" under "current data" at the bottom of the column "b" is not included within the shaded area 80 since "a8" is a ninth bit. It thus becomes "remainder data" in column "c" and is outputted on the next count (i.e., count "1").

A shaded area 81 in column "c" of the chart 70 includes the bit "a8" under "remainder data" and the bits "b0" through "b6" under "current data" (8 bits total). These bits represent the bits numbered "9"–"16" of the data bits of FIG. 4. The shaded area 81 of FIG. 5 thus corresponds to the second outgoing byte "bb" of FIG. 4. A similar progression column by column in the chart 70 of FIG. 5 of shaded areas 82 through 88 (each 8 bits long) thus represents outgoing bytes "cc" through "ii" of FIG. 4. The nine shaded areas 80–88 of the chart 70 of FIG. 5 therefore represent the first nine outgoing bytes "aa" through "ii" of FIG. 4. All 72 bits (and in numerical sequence) of the initial eight incoming 9-bit bytes "a" through "h" are accounted for in the initial nine outgoing bytes "aa" through "ii". The shaded areas 80–88 of FIG. 5 show clock count by clock count how the incoming and outgoing bytes and their respective bits are passed through the converter 60 of FIG. 4. Thus, by comparing respective bits and bytes of the incoming data stream 52 with the bits and bytes of the outgoing data stream 62 of FIG. 4, the bit chart 70 of FIG. 5 is easily understood. This chart 70 in turn will readily show how wiring paths and switch connections within the converter 60 are made, as will presently be explained.

It is noted in FIG. 5 that in the upper half of column "j" of the chart 70, the bits "h1" through "h8" within the shaded area 88 all represent "remainder data". It is clearly seen from FIG. 4 that the 8 bits numbered "65"–"72" in the outgoing byte "ii" are the ones remaining (hence the designation "remainder data") from the incoming 72 bits after 64 bits have been accounted for by the first eight outgoing bytes "aa" through "hh".

As seen in FIG. 5, the lower half of the column "j" is designated "current data" and shows bits "i0" through "i8". These 9 bits correspond to the respective bits "0"–"8" of the incoming byte "i" of FIG. 4. As incoming "current data" in chart 70 of FIG. 5 only the first 8 bits "i0"–"i7" of the byte "i" are used by the converter 60 in its next output cycle. Thus only bits "i0"–"i7" are included within a shaded area 90 in the lower portion of the column "j". The bit "j8" becomes "remainder data" and is processed on a subsequent count (column "k" of chart 70).

The bits "i0"–"i7" within the shaded area 90 of the chart 70 are outputted by the converter 60 (see FIG. 4) as the outgoing byte "jj" (with bits numbered "73"–"80") a half-clock interval 66 (t/2) after a count "0". There is thus a half-clock interval 66 (t/2) between the outgoing byte "ii" and the byte "jj" (and between the byte "jj" and the byte "kk"). The reason for this was explained previously in connection with the shaded area 80 (containing the bits "a0"–"a7") of column "b" representing outgoing byte "aa". Each half-count 68 satisfies the need to output a total of 72 bits in a group of 9 outgoing bytes each of 8 bits, within the cumulative time "T" during which 8 incoming bytes of 9 bits each are inputted to the converter 60.

As seen in FIG. 5, there is a succession of nine shaded areas 90–98 each 8 bits long. These nine shaded areas 90–98 are akin to the shaded areas 80–88 previously described. The shaded areas 90–98 represent respectively a next 9 outgoing bytes "jj", "kk", etc. of FIG. 4 (only bytes "jj" and "kk" being actually shown).

As seen in FIG. 5, the column "r" of the chart 70 (the last column actually shown) has a lower half showing 9 bits "q0"–"q8" as "current data". Only 8 bits "q0"–"q7" are enclosed within a shaded area 100 for the reasons given previously in connection with the shaded areas 80 and 90. The shaded area 100 corresponds to an outgoing byte (not shown). The chart 70 may be visualized as extending beyond the last column "r", cycle after cycle, and count after count until all of the data in the incoming data stream 52 of FIG. 4 have been converted into the outgoing data stream 62. In summary, the outgoing bytes with predetermined sets of bits represented by the shaded areas 80, 90, 100, etc. are outputted by the converter 60 on a half-count 68 which occurs a half-clock interval 66 after the beginning of a clock "0". The remaining outgoing bytes with predetermined sets of bits represented by the remaining shaded areas 81–88, 91–98, etc. are outputted at the beginning of their respective counts "0"–"7". This is also clearly shown in FIG. 4.

It is now clear from the bit chart 70 of FIG. 5 how incoming bytes and outgoing bytes and their respective bits, are "clocked" through the converter 60 one count at a time. The cycle of full counts "0"–"7" (and an extra half-count 68, not shown here but further explained hereinafter) repeats column by column along the row 74 as shown in the chart 70. Bytes having 8 bits each are outputted on respective counts (including a half-count) by the converter 60 as indicated by the shaded areas 80–88, 90–98, and so on. On the beginning of each full count an incoming 9-bit byte is inputted to the converter 60 and an outgoing 8-bit byte is outputted. The extra half-count 68 (in addition to eight full counts "0"–"7") permits an ninth outgoing byte of 8 bits to be outputted from the converter 60 within the time "T". Using the bit chart 70, with its shaded areas 80–88, 9–98, etc., and the various alpha-numeric bits identified column by column and clock count by clock count, it is easily possible to understand the construction and operation of the converter 60 now to be described.

Figure 6:
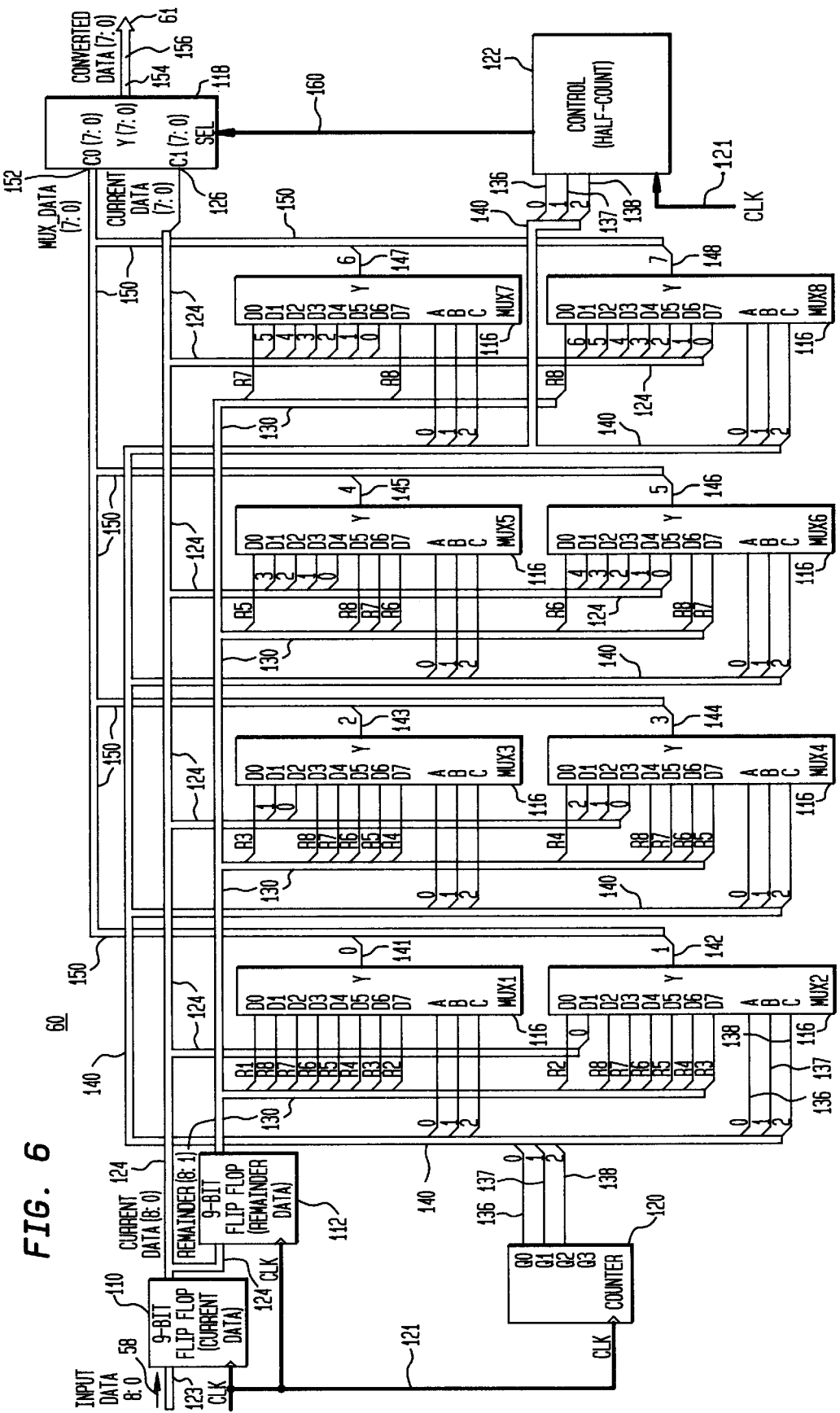
FIG. 6 is a schematic circuit diagram of the converter illustrated in FIG. 4.

Referring now to FIG. 6, there is shown in schematic circuit form the (9:8) bit converter 60 (FIG. 4). The converter 60 comprises a first (current data) flip flop 110 (shown as 9-Bit Flip Flop), a second (remainder data) flip flop 112 (shown as 9-bit Flip Flop), a switch array of eight identical multiplex (MUX) units 116 designated: MUX "1"–MUX "8"; an output multiplex (MUX) unit 118, a binary counter 120 and a control 122 for deriving each half-count 68 (see FIG. 4) after a respective count "0". The flip-flops 110 and 112, the counter 120 and the control 122 are controlled by clock signals (not shown) applied to respective inputs (not shown) which are connected to a common clock-signal (CLK) lead 121. The MUXs 116 each have eight data bit inputs "D0"–"D7" and a single bit output "Y" designated respectively "0"–"7" for MUXs 1–8. For example, the Y output of MUX8 is "7". Each of these flip flops, counter and MUXs is well known in the art.

The first flip flop 110 receives (as indicated by the arrow 58 of FIG. 4) incoming 9-bit parallel bytes as "current data" via and input buss 123 having 9 bit paths (8:0) in parallel.

The 9 bits of each incoming byte (e.g., the bytes "a", "b", etc. of FIG. 4) are momentarily stored during each clock count in their respective bit positions (not shown) within the flip flop 110. Respective bit outputs (not shown) of the flip flop 110 are coupled to a "current data" buss 124 having 9 parallel paths (8:0) The current data buss 124 is connected to 9 respective input bit positions (not shown) of the second flip flop 112. The first eight paths within the current data buss, corresponding to "current data" bit positions "0"–"7" but not position "8", are connected respectively to 8 input bit positions "0"–"7" (not shown) of a lower input 126 (C1) of the MUX 118. Various ones of the parallel paths within the current data buss 124 are connected to selected ones of inputs designated "D0" to "D7" of the eight MUXs 116, as will presently be described in further detail.

The second flip flop 112 momentarily stores as "remainder data" the 9 bits of a byte transferred to it on each clock count from the current data flip flop 110. Selected bit outputs (eight in number) of the second flip flop 112 are respectively coupled to a "remainder data" buss 130 having 8 parallel paths (8:1) Various ones of eight parallel paths (hereinafter designated "R1"–"R8") within the buss 130 are connected to selected ones of the inputs "D0"–"D7" of the eight MUXs 116, as will presently be described in further detail.

The counter 120 is a three-bit binary counter having bit outputs indicated at "Q0", "Q1" and "Q2" is respectively coupled to separate paths 136, 137 and 138, of a "count" buss 140. The paths 136, 137, 138 (representing respective bit positions "0", "1" and "2" of the counter 120) of the count bus 140 are coupled to respective ones of clock-inputs "A", "B", "C", of the respective MUXs 116. The paths 136, 137, 138, at a right end of the buss 140, are also connected to respective bit positions "0", "1" and "2" of inputs (not shown) of the control 122.

Each of the eight MUXs 116 (MUX 1–8) has a single-bit output "Y" (designated respectively "0" for MUX 1, to "7" for MUX 8). Each output "Y" is coupled respectively to one of parallel bit paths 141–148 of a (7:0) data buss 150. A right end of the data buss 150 is connected to an upper input 152 (C0) of the MUX 118, the separate paths 141–148 of the buss 150 being connected to respective input bit positions "0"–"7" (not shown) of the MUX 118. An output 154 of the MUX 118, with "0"–"7" parallel bit positions (not shown) is connected to an output (7:0) buss 156. The output buss 156 transmits parallel outgoing bytes (e.g., bytes "aa", "bb", etc.) from the converter 60 in a direction indicated by the arrow 61 (see FIG. 4) to a phasor (not shown).

The control 122, on receipt of a count "0" generates a delay of a half-count interval "t/2" (indicated at 66 in FIG. 4) and then applies a half-count signal (indicated at 68 in FIG. 4) to a lead 160. The lead 160 is coupled to an input (designated SEL) of the MUX 118. When half-count signal is applied via the lead 160 to the MUX 118, its lower input 126 is selected and the 8 parallel bits "0"–"7", but not the ninth bit "8", then stored in the current data flip flop 110 are transferred through the MUX 118 to the output buss 156. The sets of eight "current data" bits "0"–"7" are represented by the shaded areas 80, 90, 100, etc. of the bit chart 70 of FIG. 5, and are the respective output bytes "aa", "jj", etc., of FIG. 4.

As seen in FIG. 6, each of the MUXs 116 is an eight-position switch. Counts "0"–"7", in sequence, are applied to each MUX 116 at respective binary inputs "A", "B", "C" via the buss 140 from the counter 120. On a count "0" each bit input "D0" of each MUX 116 is connected to the respective output "Y"; on a count "1", bit input "D1" is connected to "Y", and so on count after count. This linear sequence then repeats on a next count cycle "0"–"7", and so on. Therefore, depending on which bit positions of the respective outputs of the current data flip flop 110 and the remainder data flip flop 112 are coupled (via the busses 124 and 130) to the sixty-four respective inputs "D0"–"D7", the eight MUXs 116 (on successive full counts "0"–"7") select clock count by clock count a desired set of eight bits of data (see the bit chart 70 of FIG. 5) and output them (at respective outputs "Y") in parallel as an outgoing (7:0) byte.

The following Table 1 shows permanent wiring connections within the converter 60 running according to predetermined patterns from output bit positions of the current data flip flop 110 and of the remainder data flip flop 112 to respective ones of the sixty-four inputs "D0"–"D7" of the eight MUXs 116.

TABLE 1

| Row No. | Count No. | In-puts | MUX1 | MUX2 | MUX3 | MUX4 | MUX5 | MUX6 | MUX7 | MUX8 |
|---|---|---|---|---|---|---|---|---|---|---|
| 1 | 0 | D0 | R1 | R2 | R3 | R4 | R5 | R6 | R7 | R8 |
| 2 | 1 | D1 | R8 | 0 | 1 | 2 | 3 | 4 | 5 | 6 |
| 3 | 2 | D2 | R7 | R8 | 0 | 1 | 2 | 3 | 4 | 5 |
| 4 | 3 | D3 | R6 | R7 | R8 | 0 | 1 | 2 | 3 | 4 |
| 5 | 4 | D4 | R5 | R6 | R7 | R8 | 0 | 1 | 2 | 3 |
| 6 | 5 | D5 | R4 | R5 | R6 | R7 | R8 | 0 | 1 | 2 |
| 7 | 6 | D6 | R3 | R4 | R5 | R6 | R7 | R8 | 0 | 1 |
| 8 | 7 | D7 | R2 | R3 | R4 | R5 | R6 | R7 | R8 | 0 |

Table 1 is arranged in 11 vertical columns, with respective headings, and in 8 horizontal rows numbered 1–8. For simplicity of explanation, here (and in FIG. 6) the 8 bit positions (but not position "0") of the remainder data flip flop 112 have been given alpha-numeric designations "R1"–"R8", and only the first 7 bit positions of the current data flip flop 110 have been given numeric-only designation "0"–"6".

Row 1 of the Table 1 shows that the input "D0" (column 3) of the MUX 1 (column 4) on a count "0" (column 2) is coupled to "R1" (bit position "1" of the remainder data flip flop 112). Similarly, input "D0" of MUX 2 is coupled to "R2" and so on across the row 1. These connections are exactly the same as those shown in FIG. 6. Row 2 of the Table 1 similarly shows that the inputs "D1" of the eight MUXs 1–8 are coupled respectively to bit position "R8" (column 4) of the remainder data flip flop 112, and to bit positions "0"–"6" (columns 5–11) of the current data flip flop 110. The Table 1 continues row by row to the eighth row and shows all of the connections to all of the sixty-four inputs "D0"–"D7" of the MUXs 1–8 (FIG. 6) from the flip flops 110 and 112. These input connections (which are sequentially coupled in sets clock count by clock count to the outputs "Y" of the eight MUXs 1–8) are derived (predetermined by) from the bit chart 70 of FIG. 5.

The bit chart 70 of FIG. 5 clearly shows (using equivalent terminology) the various connections listed in the Table 1. Thus, for example, in column "c" of the chart 70 for a count "1" the shaded area 81 includes a single remainder data bit ("a8") and 7 current data bits ("b0"–"b6"). Table 1, in row 2, shows that for a count "1", input "D1" of MUX 1 is connected to the remainder data bit position "R8", here designated "R8". This may be understood as corresponding to the bit "a8" in the shaded area 81 of the chart 70, or to the remainder data bit of "i8" in the shaded area 91, and so on. Similarly, as shown in the Table 1, row 2, the input "D1" of MUX 2 is connected to current data bit position "0", here designated "0"; the input "D1" of MUX 3 is connected to a bit position "1" of current data, and so on, to bit position "6" of current data for MUX 8. Thus, the row 2 of Table 1 shows that for any count "1" a single remainder data bit "R8", and seven "current data" bits "0"–"6" will be outputted in parallel by the eight MUXs 1–8 at their outputs "Y". This set of a single remainder data bit and seven current data bits corresponds to those in the shaded areas 81, 91, etc., of the bit chart 70 of FIG. 5.

On a next count "2" (row 3, of Table 1) a set of two remainder data bits "R7", "R8" and six current data bits "0"–"5" are outputted, (corresponding to the shaded areas 82, 92, etc.) and so on clock count by clock count. Thus, the relationship between the Table 1and the bit chart 70 is evident; the respective connections listed in the Table 1 are identical to the ones shown in FIG. 6.

It will now be understood that the bit chart 70 of FIG. 5 illustrates a general principle of the invention employed in converting incoming parallel bytes, each of a given number of bits into outgoing parallel bytes each of a different number of bits. The separate bits of incoming bytes (FIG. 4) are momentarily stored in respective memory positions (of flip flops) as "current data" and as "remainder data" (FIG. 6). For any given output count a predetermined set of the bits stored as "current data", "remainder data", or partly both (as represented by the shaded areas 80–88, 90–98, etc., of the bit chart 70) are assembled into an outgoing parallel byte having a desired number of bits. Compensation is periodically made in the number of outgoing bytes outputted within a given elapsed time (e.g., a time "T") by a converter relative to the number of incoming bytes within the time to equalize the total number of bits inputted and outputted during this time. This sequence of outgoing bytes continues clock count by clock count for as long as there are incoming bytes. The original numerical sequence of the bits in the incoming bytes is maintained for the bits in the outgoing bytes.

Figure 7:
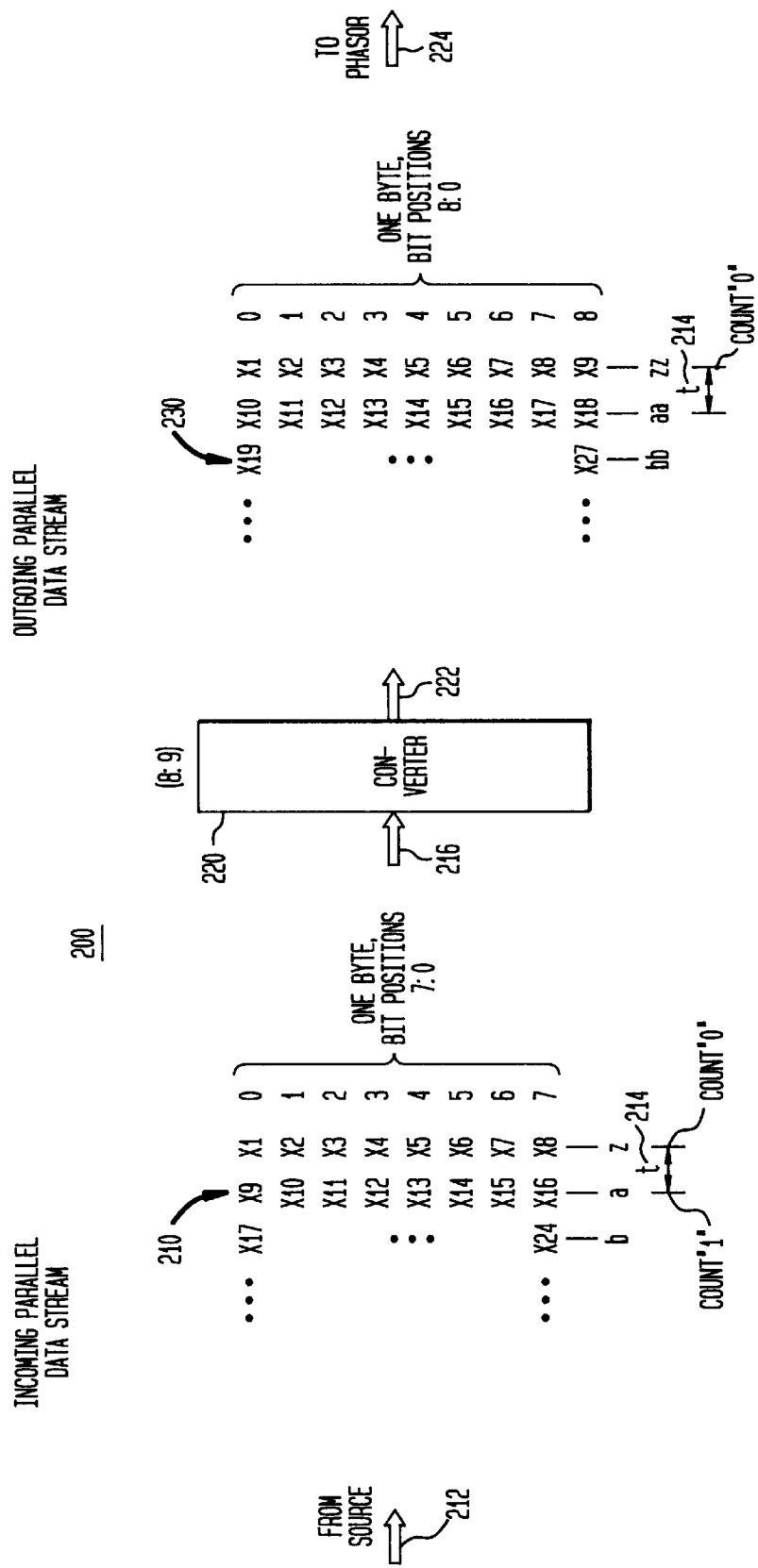
FIG. 7 is a schematic diagram illustrating an incoming data stream of successive bytes, each with 8 bits in parallel; being applied to an eight to nine (8:9) converter, also provided in accordance with the invention, where the converter provides an outgoing data stream of successive bytes, each with 9 bits in parallel.

Referring now to FIG. 7, there is shown a schematic diagram 200 comprising an incoming data stream (having 8-bit bytes in parallel) generally indicated at 210, and 8 to 9 bit converter 220 embodying features of the invention, and an outgoing data stream (having 9-bit bytes in parallel) generally indicated at 230. The incoming data stream 210 is derived from a source (not shown) as indicated by an arrow 212. The data stream 210 comprises successive 8 bit bytes, the first one being byte "z", the next byte "a", the next byte "b", and so on. The respective bytes "z", "a", "b", etc. occur on respective input counts "0", "1", etc. to "8", which counts are then repeated "0"–"8", and so on for as many bytes as there are in the incoming data stream 210 (only three bytes being actually shown). An interval "t" between successive counts (and bytes) is indicated at 214. Bit positions within each byte are designated "0"–"7" as shown. The incoming data stream 210 is inputted byte by byte to the (8:9) converter 220 as indicated by an arrow 216.

The outgoing data stream 230 is outputted byte by byte from the (8:9) converter 220 as indicated by an arrow 222. The first byte is designated byte "zz", the next is designated "aa", the next is designated "bb", and so on (only three bytes being actually shown). Bit positions within each outgoing byte are designated "0"–"8", as shown. Note that the individual bits "x" of each incoming and outgoing byte are consecutively numbered 1, 2, 3, etc. Bits numbered "1–8" are in the first incoming byte "z" whereas bits numbered "1"–"9" are in the first outgoing byte "zz". The outgoing bytes are applied to a phasor (not shown) as indicated by an arrow 224. There are nine incoming (7:0) bytes (with bits numbered "1"–"72", only some of which are shown) inputted to the converter 220, while eight outgoing (8:0) bytes (with bits "1"–"72", only some of which are shown) are outputted. The similarities and the differences between the incoming and outgoing data streams of 210 and 230 of FIG. 7 and the corresponding data streams of FIG. 4 are easily seen. These similarities and differences help illustrate the versatility of the present invention in converting from bytes of a given bit count to bytes of a different (greater or smaller) bit count.

Figure 8:
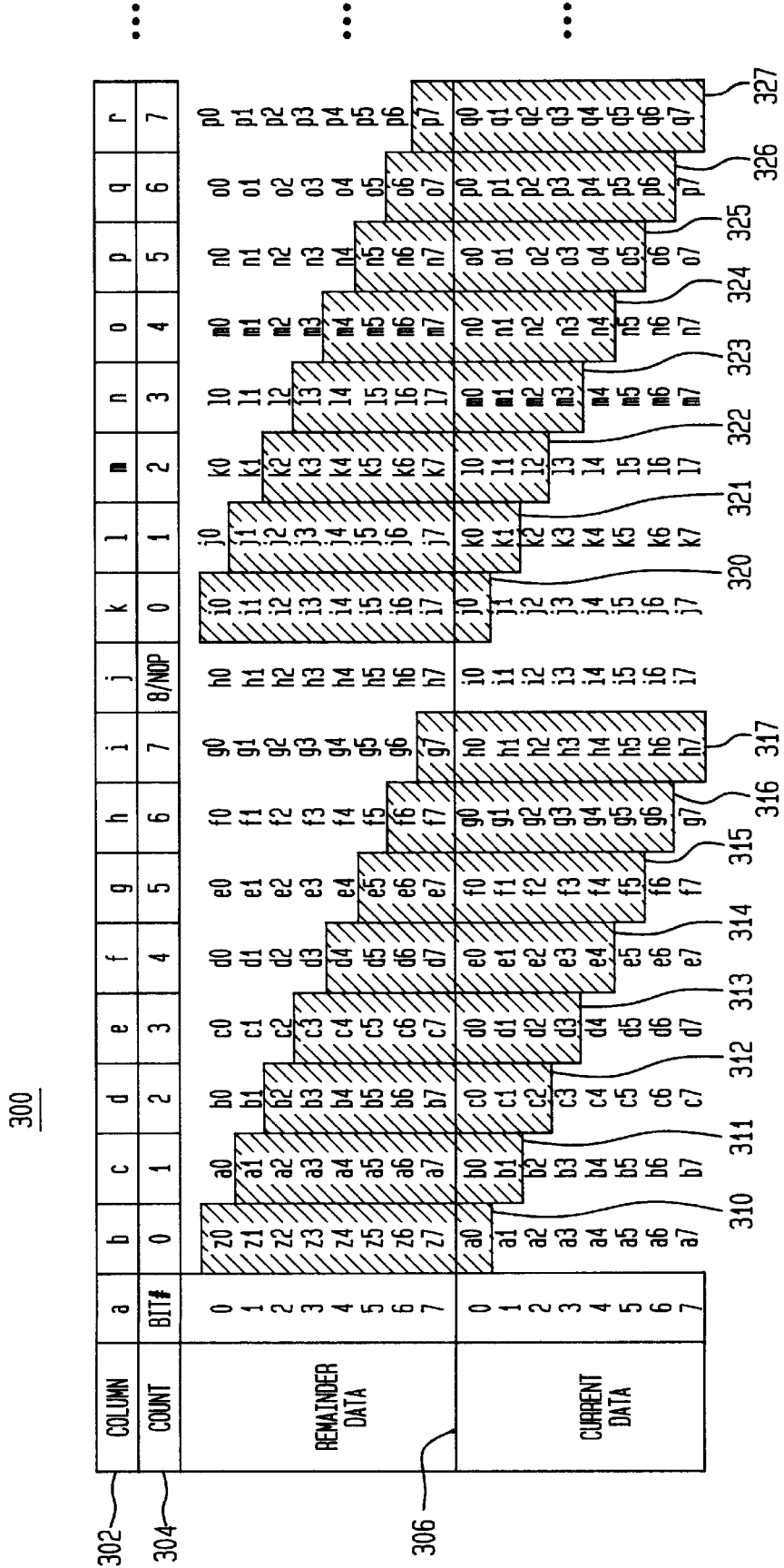
FIG. 8 is a bit chart representing a sequence of incoming 8-bit bytes being converted by the converter of FIG. 7 into a sequence of outgoing 9-bit bytes.

Referring now to FIG. 8, there is shown a bit chart 300 which illustrates graphically how incoming 8-bit bytes are quickly converted by the (8:9) converter 220 clock count by clock count into outgoing 9-bit bytes. This bit chart 300 is easily understood from the schematic diagram 200 of FIG. 7. The chart 300 is analogous to, though different in some details from, the bit chart 70 of FIG. 5 which has previously been described. Most of the explanation of the meaning of the bit chart 70 is applicable to the bit chart 300 of FIG. 8.

The bit chart 300 represents the conversion of incoming 8-bit bytes into outgoing 9-bit bytes (FIG. 7). The chart 300 has a first horizontal row 302 giving column designations "a", "b", "c", etc. A second horizontal row 304 shows nine respective counts "0"–"7" and a count "8/NOP", which then repeat, as will be explained presently. In column "a" of the bit chart 300 there are eight bit positions "0"–"7" designated "remainder data"and, below a horizontal line 306, eight bit positions "0"–"7" designated "current data". These bit positions represent respective positions of the bits in successive incoming 8-bit bytes.

Eight shaded areas 310–317 shown respectively for counts "0"–"7", and eight shaded areas 320–327 for another cycle of counts "0"–"7" represent 8 successive outgoing 9-bit bytes. In addition to these counts "0"–"7", there is a ninth count "8/NOP" (no-operation) during which the (8:9) converter 220 does not output an outgoing byte. Before outputting on counts "0"–"7" 8 bytes of 9 bits each (72 bits total) the (8:9) converter 220 must pause during a ninth count "8/NOP", and allow itself to receive an extra (ninth) incoming byte of 8 bits to bring the total of incoming bits to 72 during the following counts "0"–"7". This will be further explained hereinafter. It is noted also that for simplicity of explanation the first incoming (7:0) byte (FIG. 7) has been designated byte "z". In the bit chart 300, the corresponding bits "z0"–"z7" are shown in column b, count "0" as "remainder data". A count (not shown) previous to count "0" in column b would in fact be a count "8/NOP" (see also column j) which represents a pause (no operation) in the outputting of an (8:0) byte by the (8:9) converter 220 while an extra incoming (7:0) byte is inputted to it. Thus the eight bits "z0"–"z7" of column b of the incoming byte "z" (received on a previous count "8/NOP") are already stored on a count "0" as "remainder data" while the bits "a0"–"a7" of the next incoming byte "a" are stored as "current data". Therefore, on a count "0" (column b) the eight bits "z0"–"z7" and a single bit "a0" stored under current data (all shown within the shaded area 310) are outputted by the (8:9) converter 220 as the first outgoing (8:0) byte "zz" (FIG. 7). Note also in this regard that in lower part of column "j", incoming bits "i0"–"i7" of an incoming (8-bit) byte "i" are received and stored under "current data" for a count "8/NOP". Then as shown in column "k" the bits "i0"–"i7", now stored as "remainder data" are outputted on a next count "0" (along with a bit "j0" under "current data"), as indicated by the shaded area 320 (which is akin to the shaded area 310).

Figure 9:
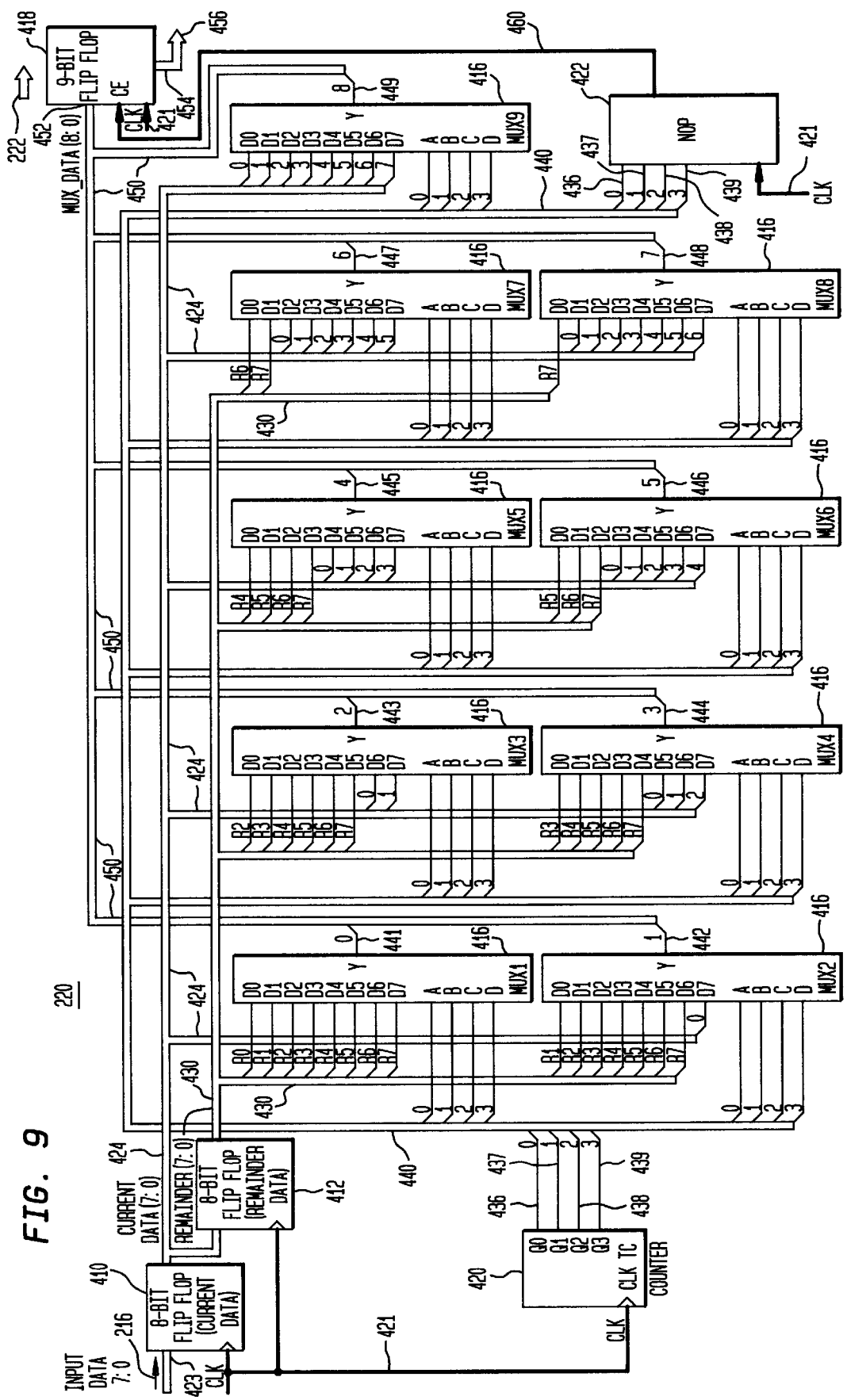
FIG. 9 is a schematic circuit diagram of the converter illustrated in FIG. 7.

Referring now to FIG. 9, there is shown in block diagram form the (8:9) converter 20 of FIG. 7. The converter 220 comprises a first (current data) flip flop 410 (shown as 8-bit flip flop), a second (remainder data) flip flop 412 (shown as 8-bit flip flop), a switch array generally indicated at 414 of nine identical multiplex (MUX) units 416 designated: MUX "1"–MUX "9"; an output flip flop 418, a binary counter 420 and a "NOP" control 422. The flip-flops 410, 412, and 418, the counter 420, and the control 422 are controlled by clock signals (not shown) applied to respective inputs (not shown) which are connected to a common clock-signal (CLK) lead 421. The nine MUXs 416 each have eight data bit inputs "D0"–"D7" and a single bit output "Y" designated respectively "0"–"8" for the nine MUXs 1–9. Each of these flip flops, counter and MUXs is well known in the art.

The first flip flop 410 receives (as indicated by the arrow 216 and FIG. 7) incoming 8-bit parallel bytes as "current data" via an input buss 423 having 8 bit paths (7:0) in parallel. The 8 bits of each incoming byte (e.g., the bytes "z" "a", "b", etc. of FIG. 7) are momentarily stored during each clock count in their respective bit positions (not shown) within the flip flop 410. Respective bit outputs (not shown) of the flip flop 410 are coupled to a "current data" buss 424 having 8 parallel paths (7:0). The current data buss 424 is connected to 8 respective input bit positions (not shown) of the second flip flop 412. Various ones of the eight parallel paths (hereinafter designated "0"–"7") within the current data buss 424 are connected to selected ones of inputs designated "D0"–"D7" of the nine MUXs 416, as will presently be described in further detail.

The second flip flop 412 momentarily stores as "remainder data" the 8 bits of a byte transferred to it on each clock count from the current data flip flop 410. Respective bit outputs of the second flip flop 412 are coupled to a "remainder data" buss 430 having 8 parallel paths (7:0) Various ones of the eight parallel paths (hereinafter designated "R0"–"R7") within the buss 430 are connected to selected ones of the seventy-two inputs "D0"–"D7" of the nine MUXs 416, as will presently by described in further detail.

The counter 420 is a four-bit binary counter (which counts "0"–"8" and then repeats) having bit outputs indicated at "Q0", "Q1", "Q2" and "Q3" as shown. Each of these outputs "Q0", "Q1", "Q2", and "Q3" is respectively coupled to separate paths 436, 437, 438, and 439 of a "count" buss 440. The four paths 436, 437, 438, and 439 (representing respective bit positions "0", "1", "2", and "3" of the counter 420) of the count buss 440 are coupled to respective ones of clock-inputs "A", "B", "C", and "D" of the respective MUXs 416. The four paths 436, 437, 438, and 439 at a right end of the buss 440 are also connected to respective bit positions "0", "1", "2", and "3" of inputs (not shown) of the NOP 422.

Each of the nine MUXs 416 (MUX 1–9) has a single-bit output "Y" (designated respectively "0" for MUX 1, to "8" for MUX 9). Each output "Y" is coupled respectively to one of parallel bit paths 441–449 of a (8:0) data buss 450. A right end of the data buss 450 is connected to an input 452 of the flip flop 418, the separate paths 441–449 of the buss 450 being connected to respective input bit positions "0"–"8" (not shown) of the flip flop 418. An output 454 of the flip flop 418, with "0"–"8" parallel bit positions (not shown) is connected to an output (8:0) buss 456. The output buss 456 transmits parallel outgoing bytes (e.g., bytes "aa", "bb", etc.) from the converter 220 in a direction indicated by the arrow 222 (see FIG. 7) to a phasor (not shown).

The NOP 422, on receipt of a count "8" (as four binary bits) from the counter 420 applies an inhibit signal to a lead 460. The lead 460 is coupled to an input (designated CE) of the flip flop 418. While the inhibit signal is applied via the lead 460 to the flip flop 418 it is unable to receive data from the (8:0) buss 450. Thus no data is transferred to the output (8:0) buss 456 during a count "8/NOP", as indicated by the absence of a shaded area in column "j" of the bit chart 300 (FIG. 8). On a next count "0" (immediately following a count "8" from the counter 420) the inhibit signal on the lead 460 disappears, and the flip flop 418 transfers data from the MUXs 416 then on the buss 450 to the output buss 456.

As seen in FIG. 9, each of the MUXs 416 is an eight-position switch. Counts "0"–"7", and a count "8/NOP", in sequence, are applied to each MUX 416 at respective bit inputs "A", "B", "C", "D" via the buss 440 from the counter 420. On a count "0" each bit input "D0" of each MUX 416 is connected to the respective output "Y"; on a count "1", bit input "D1" is connected to "Y", and so on to "D7" on count "7". This switching sequence of inputs to output through the MUXs 416 pauses during a ninth count "8/NOP", then repeats on a next count sequence "0"–"7", and "8/NOP", and so on. Therefore, depending on which bit positions of the respective outputs of the current data flip flop 410 and the remainder data flip flop 412 are coupled (via the busses 424 and 430) to the seventy-two respective inputs "D0"–"D7", the nine MUXs 416 on successive counts "0"–"7" (but not a count "8/NOP"), select clock count by clock count a desired set of nine incoming bits of data (see the shaded areas of bit chart 300 of FIG. 8) and output them (at respective outputs "Y") in parallel onto the buss 450 and through the flip flop 418 as an outgoing (8:0) byte on the output buss 456.

The following Table 2 shows permanent wiring connections within the (8:9) converter 220 running, according to predetermined patterns, from output bit positions of the current data flip flop 410 and of the remainder data flip flop 412 to respective ones of the seventy-two inputs "D0"–"D7" of the nine MUXs 416.

positions of the current data flip flop 410 have been given numeric-only designation "0"–"7".

Row 1 of the Table 2 shows that the input "D0" (column 3) of the MUX 1 (column 4) on a count "0" (column 2) is coupled to "R0" (bit position "0" of the remainder data flip flop 412). Similarly, input "D0" of MUX 2 is coupled to "R1" and so on across the row 1 to "0" (bit position "0" of the current data flip flop 410) for the MUX 9. These connections are exactly the same as those shown in FIG. 9. Row 2 of the Table 2 similarly shows that the inputs "D1" of the nine MUXs 1–9 are coupled respectively to bit position "R1"–"R7" (columns 4–10) of the remainder data flip flop 412, and to bit positions "0"–"1" (columns 11 and 12) of the current data flip flop 410. The Table 2 continues row by row to the eighth row and shows all of the connections to all of the seventy-two inputs "D0"–"D7" of the MUXs 1–9 (FIG. 9) from the flip flops 410 and 412. These input connections (which are sequentially coupled in sets clock count by clock count to the outputs "Y" of the nine MUXs 1–9) are derived from (predetermined by) the bit chart 300 of FIG. 8.

The bit chart 300 of FIG. 8 clearly shows (using equivalent terminology) the various connections listed in the Table 2. Thus, for example, in column "c" of the chart 300 for a count "1" the shaded area 311 includes seven remainder data bits ("a1"–"a7") and two current data bits ("b0"–"b1"). The Table 2, in row 2 shows that for a count "1", input "R1" of MUX 1 is connected to the respective remainder data bit position. This may be understood as corresponding to the remainder data bit "a1" in the shaded area 311 of the chart 300, or to the remainder data bit of "j1" in the shaded area 321, and so on. Similarly, as shown in the Table 2, row 2, the input "D1" of MUX 2 is connected to remainder data bit position "R2"; the input "D1" of MUX 3 is connected to a remainder data bit position "R3", and so on, to remainder data bit position "R7" for MUX 7 and to current data bit position "0" for MUX 8, and to current data position "1" for MUX 9. Thus, the row 2 of Table 1 shows that for any count "1" seven remainder data bits "R1"–"R7", and two "current data" bits "0", "1" will be outputted in parallel by the nine MUXs 1–9 at their outputs "Y". This set of remainder data bits and current data bits corresponds to those in the shaded areas 311, 321, etc., of the bit chart 300 of FIG. 8.

On a next count "2" (row 3, of Table 1) a set of six remainder data bits "R2"–"R7" and three current data bits "0"–"2" are outputted, (corresponding to the shaded areas 312, 322, etc.) and so on clock count by clock count. Thus,

TABLE 2

| Row No. | Count No. | In-puts | MUX1 | MUX2 | MUX3 | MUX4 | MUX5 | MUX6 | MUX7 | MUX 8 | MUX 9 |
| --- | --- | --- | --- | --- | --- | --- | --- | --- | --- | --- | --- |
| 1 | 0 | D0 | R0 | R1 | R2 | R3 | R4 | R5 | R6 | R7 | 0 |
| 2 | 1 | D1 | R1 | R2 | R3 | R4 | R5 | R6 | R7 | 0 | 1 |
| 3 | 2 | D2 | R2 | R3 | R4 | R5 | R6 | R7 | 0 | 1 | 2 |
| 4 | 3 | D3 | R3 | R4 | R5 | R6 | R7 | 0 | 1 | 2 | 3 |
| 5 | 4 | D4 | R4 | R5 | R6 | R7 | 0 | 1 | 2 | 3 | 4 |
| 6 | 5 | D5 | R5 | R6 | R7 | 0 | 1 | 2 | 3 | 4 | 5 |
| 7 | 6 | D6 | R6 | R7 | 0 | 1 | 2 | 3 | 4 | 5 | 6 |
| 8 | 7 | D7 | R7 | 0 | 1 | 2 | 3 | 4 | 5 | 6 | 7 |

Table 2 is arranged in 12 vertical columns, with respective headings, and in 8 horizontal rows numbered 1–8. For simplicity of explanation, here (and in FIG. 9) the 8 bit positions of the remainder data flip flop 412 have been given alpha-numeric designations "R0"–"R7", whereas the 8 bit the relationship between the Table 2 and the bit chart 300 is evident; the respective connections listed in the Table 2 are identical to the ones shown in FIG. 9.

It will now be understood that like the bit chart 70 of FIG. 5, the bit chart 300 of FIG. 8 illustrates a general principle of the invention employed in converting incoming parallel bytes, each of a given number of bits into outgoing parallel bytes each of a different number of bits. The separate bits of incoming bytes (see FIG. 7) are momentarily stored in respective memory positions (of flip flops) as "current data" and as "remainder data" (see FIG. 9). For any given output count a predetermined set of the bits stored as "current data", "remainder data", or partly both (as represented by the shaded areas 310–317, 320–327, etc., of the bit chart 300) are assembled into an outgoing parallel byte having a desired number of bits. Compensation is periodically made in the number of outgoing bytes outputted within a given elapsed time (e.g., a time "T" of FIG. 4) by a converter relative to the number of incoming bytes within the time to equalize the total number of bits inputted and outputted during this time. This sequence of outgoing bytes continues clock count by clock count for as long as there are incoming bytes. The original numerical sequence of the bits in the incoming bytes is maintained for the bits in the outgoing bytes.

Figure 10:
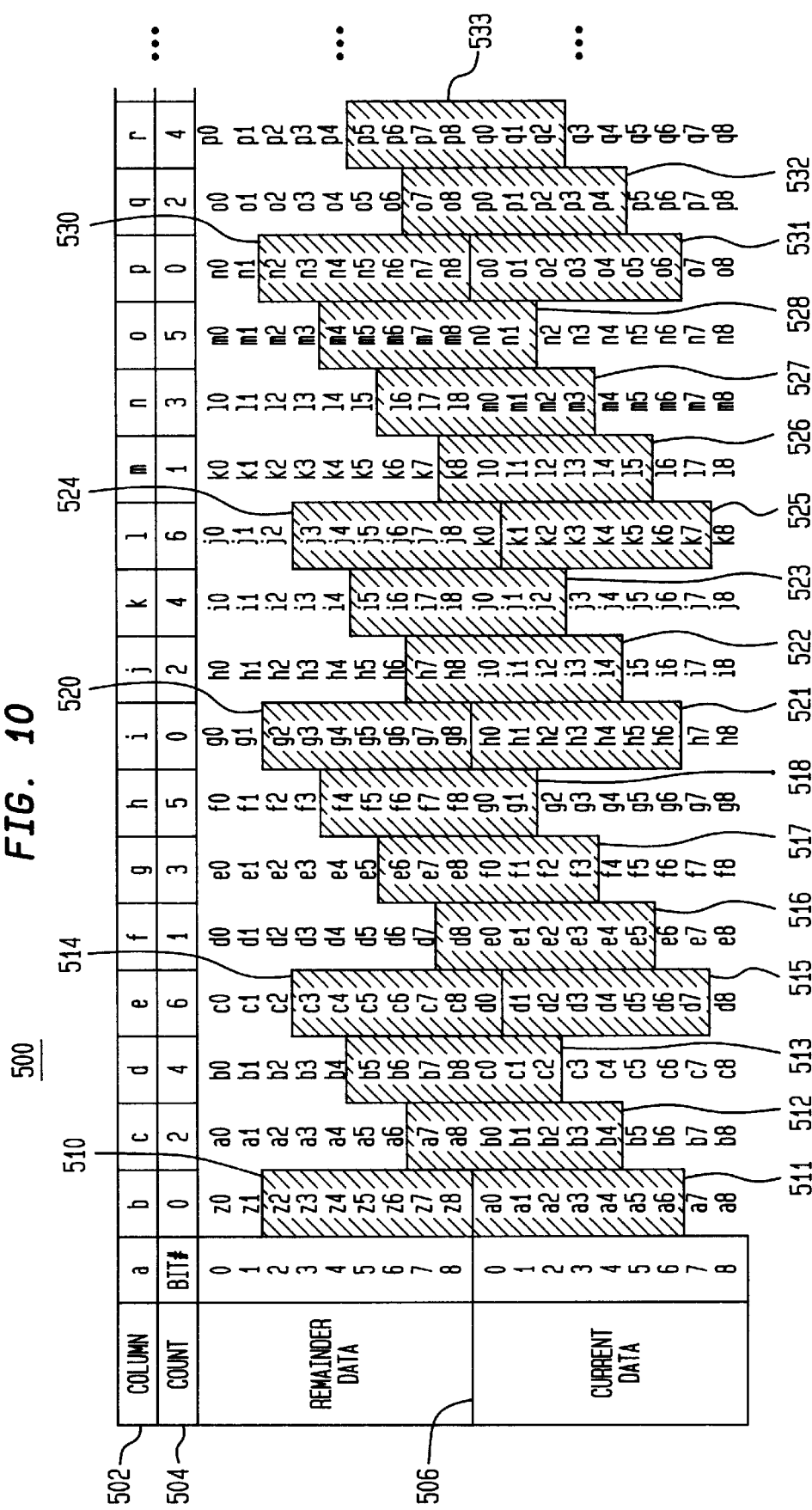
FIG. 10 is a bit chart representing a sequence of incoming 9-bit bytes being converted by a nine to seven (9:7) converter (shown in FIG. 11) into a sequence of outgoing 7-bit bytes.

Referring now to FIG. 10, there is shown a bit chart 500 which illustrates graphically how incoming 9-bit bytes are quickly converted in accordance with the invention by a (9:7) converter clock count by clock count into outgoing 7-bit bytes. A (9:7) converter will be described in detail hereinafter in connection with FIG. 11. The bit chart 500 of FIG. 10 is easily understood from the descriptions previously given in connection with the bit chart 70 (see FIG. 5) and the bit chart 300 (see FIG. 8) and from the following explanation.

The bit chart 500 is arranged in vertical columns designated by headings "a", "b", "c", etc. in a top horizontal row indicated at 502. Beneath this row is another row indicated at 504, showing a succession of full counts not in numerical sequence but in a different sequence "0", "2", "4", "6", "1", "3", "5", and repeating "0", "2", "4", "6", "1", "3", "5", and so on. How and why this different sequence of counts is employed will be explained hereinafter. The count numbers represent the decimal equivalents of respective three-bit binary counts whose bit positions are interchanged, as will be explained. A "half-count" (like the half-count 68 of FIG. 4) is not shown here though in fact, there occurs a "half-count" after each count "0", and a "half count" after each count "6" in the bit chart 500, as will be explained.

A first, upper half of column "a" of the bit chart 500 designates bit positions "0"–"8" of the respective bits of a 9-bit byte. Similarly a lower half of the column "a" shows bit positions "0"–"8" of respective bits of a 9-bit byte. An upper portion of the chart 500 is designated "remainder data" and is separated by a horizontal line 506 from a lower portion designated "current data". It is to be understood that the bit chart 500 may continue to the right beyond a column "r", which is the last one shown here.

Referring now to the lower portion of the chart 500 (which is designated "current data") column "b" reading successively downward shows alpha-numeric designations "a0" through "a8" corresponding to the respective bit positions "0"–"8" of column "a". The alpha-numeric designations "a0"–"a8" are to be understood as representing respective bit positions of an initial 9-bit byte corresponding to an incoming byte "a" (see FIG. 7). The next column "c" of the chart 500 under "current data" reads "b0" through "b8", and so on column by column to the right across the lower half (current data portion) of the chart 500 with "q0"–"q8" being the last positions shown here.

In the upper portions of column "b" of the chart 500 of FIG. 10 labeled "remainder data" the alpha-numeric designations "z0" through "z8" are shown. In the "remainder data" portion of column "c", the designations "a0"–"a8" are shown. This is a shift to the right by one column (i.e., from column "b", lower half, to column "c" upper half) of the designations "a0" through "a8". Similarly, remainder data "b0" through "b8" is found in the upper half of the column "d", and so on column by column to the right across the upper portion of the chart. The reason for this shift to the right by one column of the "remainder data" designations was explained in detail in connection with the bit charts 70 and 300 (FIG. 5 and FIG. 8).

Still referring to the bit chart 500 of FIG. 10, in column "b", under "remainder data" the set of bits "z2"–"z8" are shown within a shaded area 510. These are outputted on a count "0" by the (9:7) converter (FIG. 11) as an initial outgoing (6:0) byte (similar to outgoing byte "zz" of FIG. 7) as will be explained. The bits "a0"–"a6" in column "b" under "current data" are shown within a shaded area 511. These bits are outputted as a next outgoing (6:0) byte on a "half-count" after a count "0", as will be explained.

In column "c", the seven bits "a7", "a8", and "b0"–"b4" are shown within a shaded area 512 and are outputted as a next outgoing (6:0) byte on a respective count "2". Similarly, in column "d", bits "b5"–"b8" and "c0"–"c2" are shown within a shaded area 513, and are outputted as an outgoing (6:0) byte on count "4". In column "e", the bits "c3"–"c8" and "d0" are within a shaded area 514 and are outputted as an outgoing (6:0) byte on count "6". The bits "d1"–"d7" of column "e", shown within a shaded area 515 are outputted as an outgoing (6:0) byte on a "half-count" after a count "6". In column "f", the bits "d8" and "e0"–"e5" are within a shaded 516 and are outputted as an outgoing (6:0) byte on a count "1". Similarly, in columns "g" and "h", respectively seven bits "e6"–"e8" and "f0"–"f3" are contained in a shaded area 517 and seven bits "f4"–"f8" and "g0", "g1" in a shaded area 518. The bits in the shaded area 517 are outputted on a count "3", and those in the shaded area 518 on a count "5". In column "i", the seven bits "g2"–"g8" in a shaded area 520 are outputted on count "0". The bits "h0"–"h6" in a shaded area 521 of column "i" are outputted on a "half-count" after count "0". The shaded area 520 may be understood as akin to the shaded area 510, and the shaded area 521 as akin to the shaded area 511. Nine shaded areas 520–528 of columns "i"–"0" thus represent a next cycle of seven full counts and the added "half-counts" of the (9:7) converter (FIG. 11) in outputting nine outgoing (6:0) bytes. Another set of nine shaded areas 530, 531, 532, 533, etc. (not all of which are shown) show a next cycle of seven full counts and two half-counts of the (9:7) converter, and so on. The total number of bits outputted as (6:0) bytes during a cycle of counts is periodically made equal to the total number of bits inputted as (8:0) bytes by adding two "half-counts" provided along with seven full counts during each cycle of counts. Using the bit chart 500, with its shaded areas 510–518, 520–528, etc., and the various alpha-numeric bits identified column by column and clock count by clock count, it is easily possible to understand the construction and operation of a (9:7) converter now to be described. A schematic diagram (not shown) similar to the one shown in FIG. 4, can easily be constructed from the bit chart 500 of FIG. 10.

Figure 11:
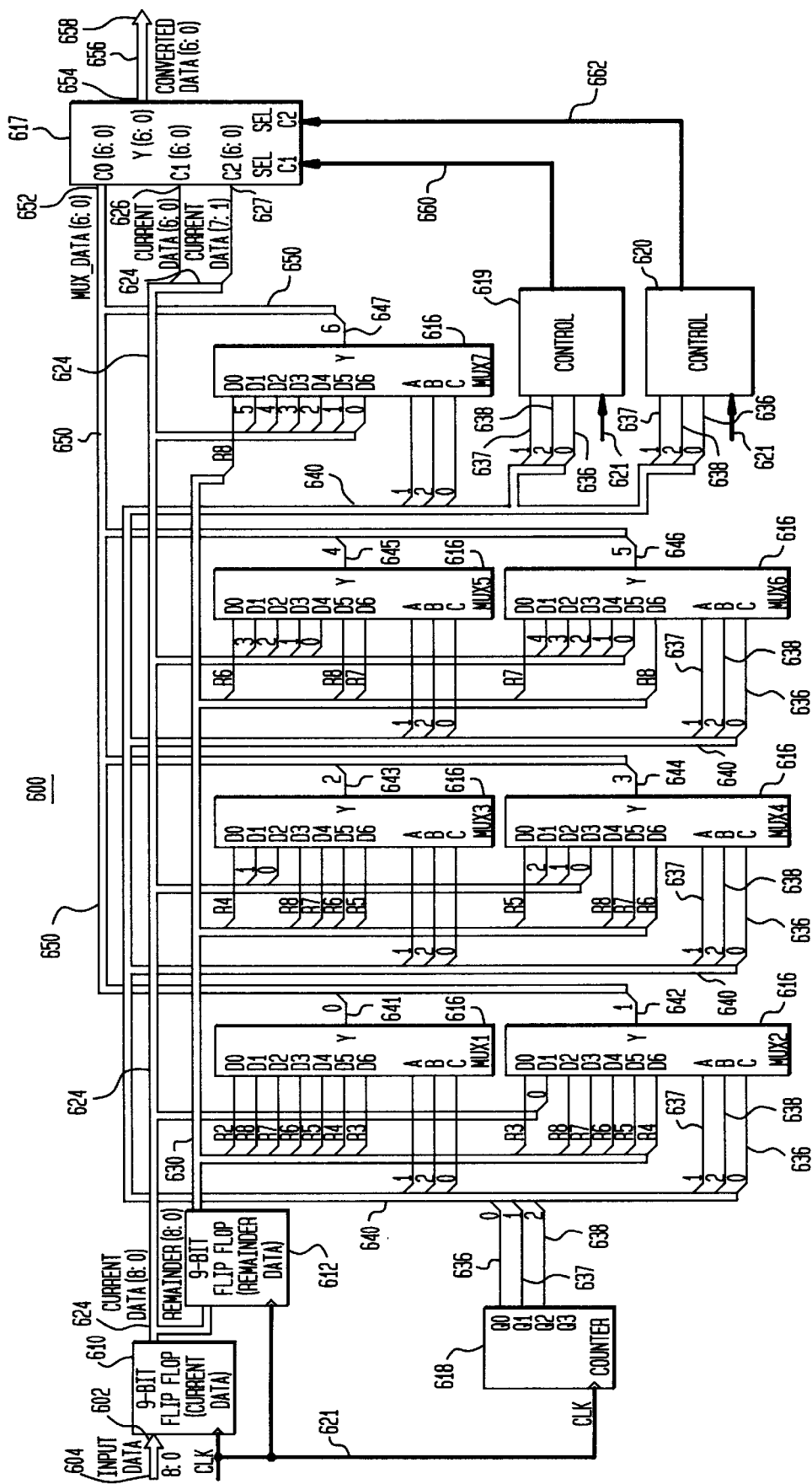
FIG. 11 is a schematic circuit diagram of a (9:7) converter (as represented by the bit chart of FIG. 10) also embodying features of the invention.

Referring now to FIG. 11, there is shown in schematic circuit form a (9:7) bit converter 600. The converter 600 comprises a first (current data) flip flop 610, a second (remainder data) flip flop 612, a switch array of seven identical multiplex (MUX) units 616 designated: MUX "1"–MUX "7"; an output multiplex (MUX) unit 617, a binary counter 618, a first control 619 for deriving a "half-count" after a respective count "0", and a second control 620 for deriving a "half-count" after a respective count "6". the flip-flops 610 and 612, the counter 618, and the controls 619 and 620, are controlled by clock signals (not shown) applied to respective inputs (not shown) which are connected to a common clock-signal (CLK) lead 621. The MUXs 616 each have seven data bit inputs "D0"–"D6" and a single bit output "Y" designated respectively "0"–"6" for the MUXs 1–7. Each of these flip flops, counter and MUXs is well known in the art.

The first flip flop 610 receives (as indicated by an arrow 602) from a source not shown, incoming 9-bit parallel bytes as "current data" via an input buss 604 having 9 bit paths (8:0) in parallel. The 9 bits of each incoming byte (e.g., the bytes "a", "b", etc. of FIG. 10) are momentarily stored during each clock count in their respective bit positions (not shown) within the flip flop 610. Respective bit outputs (not shown) of the flip flop 610 are coupled to a "current data" buss 624 having 9 parallel paths (8:0) The current data buss 624 is connected to 9 respective input bit positions (not shown) of the second (remainder data) flip flop 612. The first seven paths within the current data buss 624, corresponding to "current data" bit positions "0"–"6" but not positions "7", "8", are connected respectively to 7 input bit positions (not shown) of a middle input 627 (C1) of the MUX 617. Another seven paths within the current data buss 624, corresponding to "current data" bit positions "1"–"7" but not positions "0", "8", are connected respectively to 7 input bit positions (not shown) of a lower input 627 (C2) of the MUX 617. A first six paths (hereinafter designated "0"–"5") of the nine parallel paths within the current data buss 624 are connected to selected ones of inputs designated "D0" to "D6" of the seven MUXs 616, as will presently by described in further detail.

The second flip flop 612 momentarily stores as "remainder data" the 9 bits of a byte transferred to it on each clock count form the current data flip flop 610. Respective bit outputs "R2"–"R8" of the second flip flop 612 are coupled to a "remainder data" buss 630 having 7 parallel paths (6:0). Bit positions "0" and "1" of "remainder data" are not used (see the bit chart 500 of FIG. 10). Various ones of the seven parallel paths (hereinafter designated "R2"–"R8") within the buss 630 are connected to selected ones of the inputs "D0"–"D6" of the seven MUXs 616, as will presently be described in further detail.

The counter 618 is a three-bit binary counter having bit outputs indicated at "Q0", "Q1" and "Q2" as shown. Each of these outputs "Q0", "Q1" and "Q2" representing bit positions "0", "1", "2" as indicated, is respectively coupled to separate paths 636, 637 and 638, of a "count"buss 640. The paths 636, 637, 638 (each representing a respective bit position "0", "1" or "2" of the counter 618) are coupled in a transposed sequence to respective ones of clock-inputs "A", "B", "C", of the respective MUXs 616. The path 636 is thus coupled to respective inputs "C", (designated bit position "0"), the path 637 to respective inputs "A" (designated bit position "1") and the path 638 to respective inputs "B" (designated bit position "2") of the MUXs 616. Similarly, the paths 636, 637, 638, at a right end of the buss 640 are also connected to respective bit positions "1", "2" and "0" of inputs (not shown) of the controls 619 and 620. By transposing the leads 636, 637, and 638 as shown, the count sequence applied to each MUX 616 and to the controls 619 and 620, will appear to the MUXs and controls as the decimal equivalent counts "0", "2", "4", "6", "1", "3", "5", and so on (see row 504 of the bit chart 500 of FIG. 10) even though the counter 618 is counting "0", "1", "2", "3", "4", "5", "6", and then repeating. This result is well known in the art.

Each of the seven MUXs 616 (MUX 1–7) has a single-bit output "Y" (designated respectively "0" for MUX 1, to "6" for MUX 7). Each output "Y" is coupled respectively to one of parallel bit paths 641–647of a (6:0) data buss 650. A right end of the data buss 650 is connected to an upper input 652 (C0) of the MUX 617, the separate paths 641–647 of the buss 650 being connected to respective input bit positions (not shown) of the MUX 617. An output 654 of the MUX 617, with seven parallel bit positions (not shown) is connected to an output (6:0) buss 656. The output buss 656 transmits parallel outgoing (6:0) bytes from the converter 600 in a direction indicated by an arrow 658 to a phasor (not shown).

The control 619, on receipt of a count "0" generates a delay of a half-count interval "t/2" (indicated at 66 in FIG. 4) and then applies a half-count signal (indicated at 68 in FIG. 4) to a lead 660. The lead 660 is coupled to an input (designated SEL-C1) of the MUX 617. When a half-count signal is applied via the lead 660 to the MUX 617, its center input 612 is selected and the seven parallel bits "0"–"6", but not the bits "7", "8", then stored in the current data flip flop 610 are transferred through the MUX 617 to the output buss 656. The sets of "current data" bits "0"–"6" are represented by the shaded areas 511, 521, 531, etc. of the bit chart 500 of FIG. 11, and are respective output (6:0) bytes outputted by the converter 600 on each half-count after a count "0".

The control 620 on receipt of a count "6" generates a delay of a half-count interval 66 and then applies a "half-count" signal to a lead 662 to an input (designated SEL-C2) of the MUX 617. When a "half-count" signal is applied via the lead 662 to the MUX 617, its lower input 627 is selected and the seven parallel bits then stored under "current data" in bit positions "1"–"7" but not in positions "0", "8", are transferred through the MUX 617 to the output buss 656. The sets of "current data" bits "1"–"7" are represented by the shaded area 515, 525, etc. of the bit chart 500.

As seen in FIG. 11, each of the MUXs 616 is a seven-position switch. Transposed counts in the sequence "0", "2", "4", "6", "1", "3", "5", and repeat, are applied to each MUX 616 at respective binary inputs "A", "B", "C", via the buss 640 from the counter 618. On a count "0" each bit input "D0" of each MUX 616 is connected to the respective output "Y"; on a count "2", bit input "2" is connected to "Y"; on a count "4", bit input "D4" is connected to "Y"; on a count "6", "D6" is connected to "Y"; on a count "1", "D1" is connected to "Y"; on a count "3", "D3" is connected to "Y"; and a count "5", "D5" is connected to "Y", and then the sequence is repeated. Therefore, depending on which bit positions of the respective outputs of the current data flip flop 610 and the remainder data flip flop 612 are coupled (via the busses 624 and 630) to the forty-nine respective inputs "D0"–"D6", the seven MUXs 616 select clock count by clock count a desired set of seven bits of data (see the shaded areas of the bit chart 500 of FIG. 10) and output them as a respective (6:0) outgoing byte.

The following Table 3 shows permanent wiring connections within the converter 600 running according to predetermined patterns from the output bit positions of the current data flip flop 610 and of the remainder data flip flop 612, to respective ones of the forty-none inputs "D0"–"D6" of the seven MUXs 616.

TABLE 3

| Row No. | Count No. | In-puts | MUX1 | MUX2 | MUX3 | MUX4 | MUX5 | MUX6 | MUX7 |
|---|---|---|---|---|---|---|---|---|---|
| 1 | 0 | D0 | R2 | R3 | R4 | R5 | R6 | R7 | R8 |
| 2 | 2 | D2 | R7 | R8 | 0 | 1 | 2 | 3 | 4 |
| 3 | 4 | D4 | R5 | R6 | R7 | R8 | 0 | 1 | 2 |
| 4 | 6 | D6 | R3 | R4 | R5 | R6 | R7 | R8 | 0 |
| 5 | 1 | D1 | R8 | 0 | 1 | 2 | 3 | 4 | 5 |
| 6 | 3 | D3 | R6 | R7 | R8 | 0 | 1 | 2 | 3 |
| 7 | 5 | D5 | R4 | R5 | R6 | R7 | R8 | 0 | 1 |

Table 3 is arranged in 10 vertical columns, with respective headings, and in 7 horizontal rows numbered 1–7. Note the transposed sequence of counts in the second column, and of the inputs in the third column. For simplicity of explanation, here (and in FIG. 11) 7 bit positions "R2"–"R8" (but not positions "R0", "R1") of the remainder data flip flop 612 have been given alpha-numeric designations "R2"–"R8", and only the first 7 bit positions of the current data flip flop 610 have been given numeric-only designation "0"–"6".

Row 1 of the Table 3 shows that the input "D0" (column 3) of the MUX 1 (column 4) on a count "0" (column 2) is coupled to "R2" (bit position "2" of the remainder flip flop 612). Similarly, input "D0" of MUX 2 is coupled to "R3" and so on across the row 1. These connections are exactly the same as those shown in FIG. 11. Row 2 of the Table 1 similarly shows that the inputs "D2" of the seven MUXs 1–7 are coupled respectively to bit position "R7", "R8" of the remainder data flip flop 612, and to bit positions "0"–"4" of the current data flip flop 610. The Table 3 continues row by row to the seventh row and shows all of the connections to all of the forty-nine inputs "D0"–"D6" of the MUXs 1–7 (FIG. 11) from the flip flops 610 and 612. These input connections (which are coupled in sets clock count by clock count to the outputs "Y" of the seven MUXs 1–7) are derived (predetermined by) from the bit chart 500 of FIG. 10.

Figure 12:
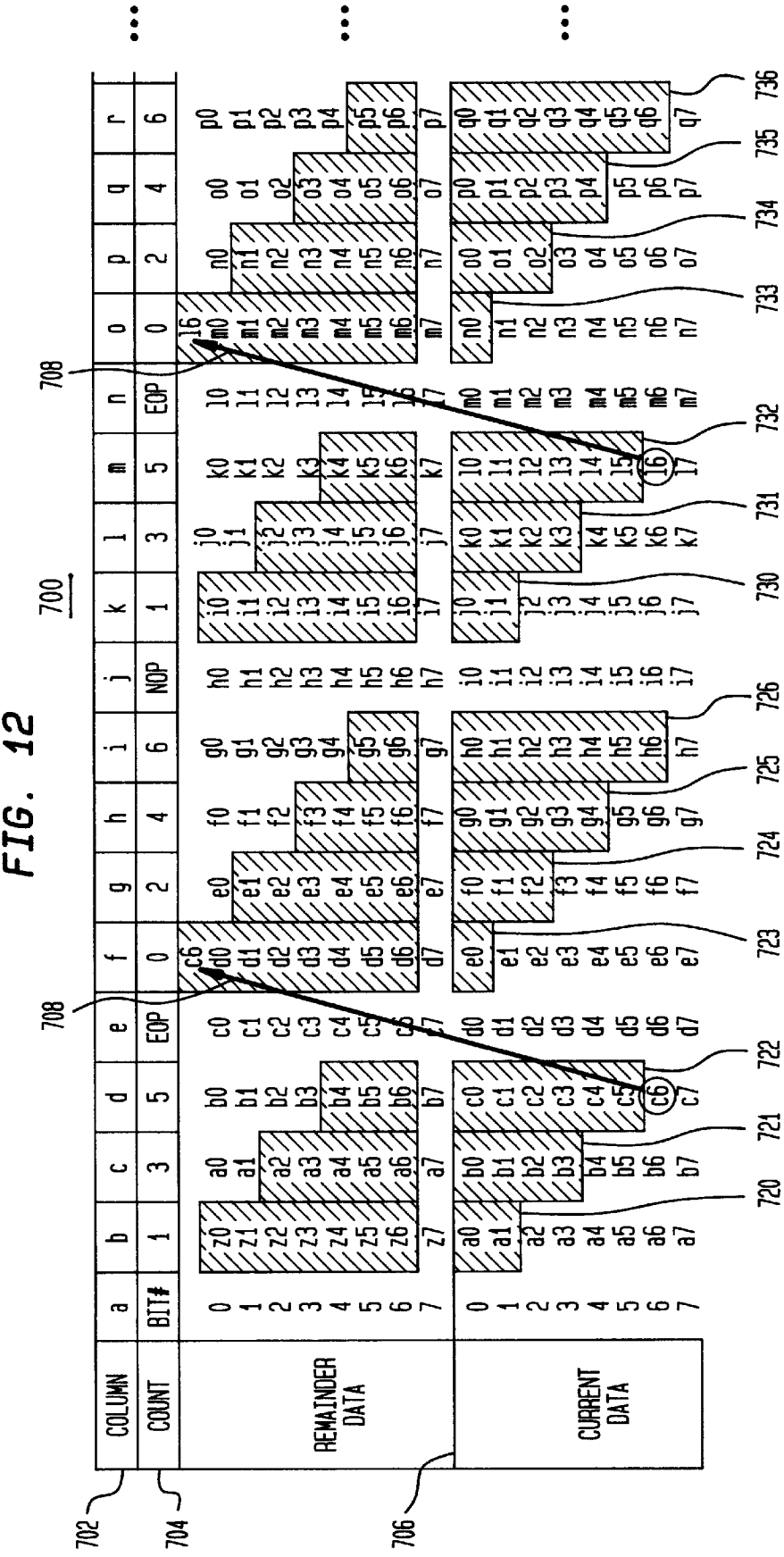
FIG. 12 is a bit chart representing a sequence of incoming 7-bit bytes being converted by a seven to nine (7:9) converter (shown in FIG. 13) into a sequence of outgoing 9-bit bytes.
Figure 13:
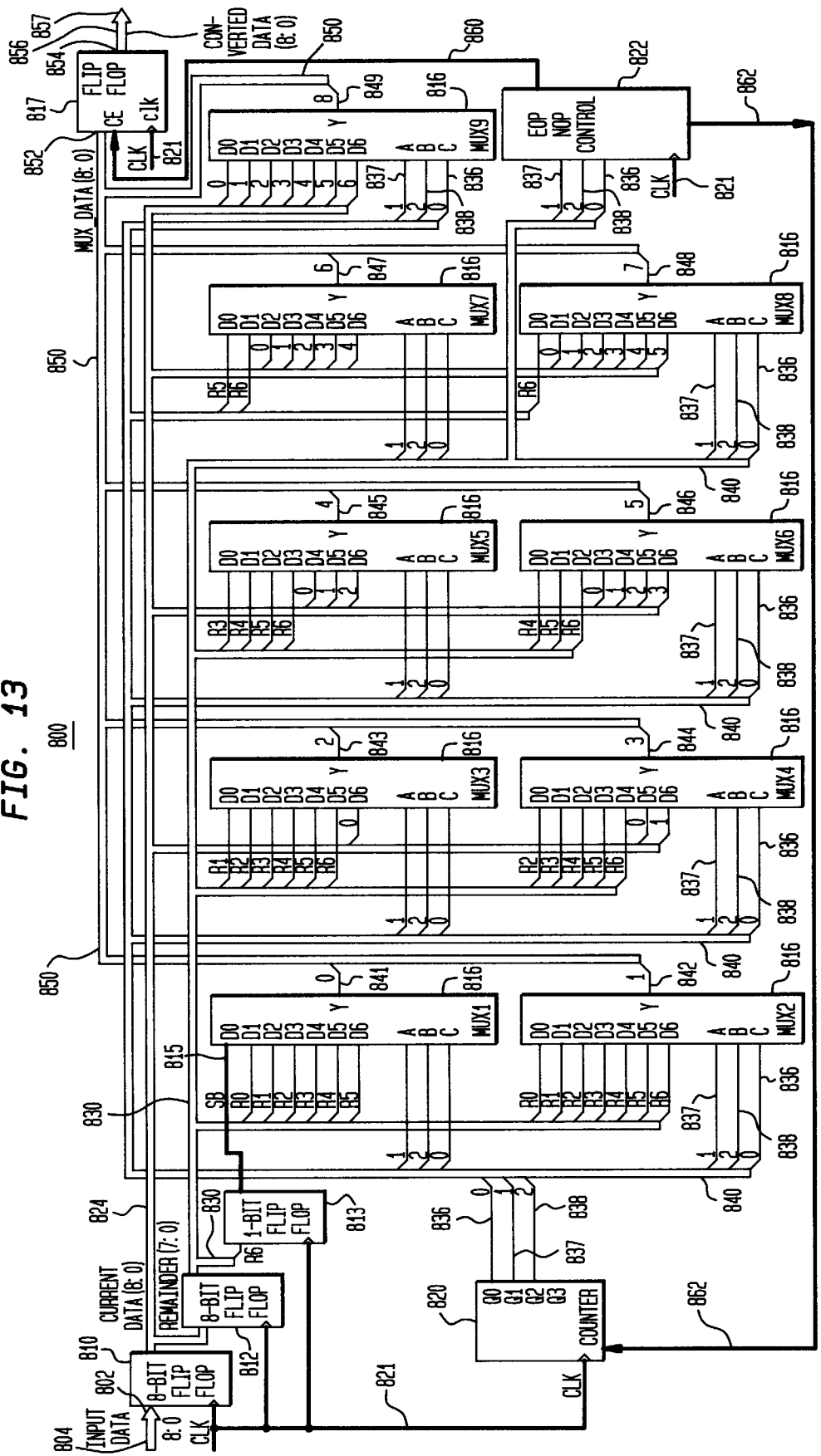
FIG. 13 is a schematic circuit diagram of a (7:9) converter (as represented by the bit chart of FIG. 12) also embodying features of the invention.

Referring now to FIG. 12, there is shown a bit chart 700 which graphically illustrates the operation of a 7 bit to 9 bit (7:9) converter shortly to be described (FIG. 13). This bit chart is easily understood from the explanations given previously in connection with the bit charts of FIGS. 5, 8 and 10, and from the following description. The bit chart 700 of FIG. 12 is arranged in vertical columns designated by headings "a", "b", "c", etc., in a top horizontal row indicated at 702. Beneath this row is another row indicated at 704, showing successive transposed counts "1", "3", "5", "EOP", "0", "2", "4", "6" "NOP", and then (at column "k") repeating "1", "3", etc. In column "a" of the bit chart 700 there are eight bit positions "0"–"7" designated "remainder data" and, below a horizontal line 706, eight bit positions "0"–"7" designated "current data". These bit positions represent respective positions of the bits in successive incoming 8-bit bytes (only seven of which bits are actually used).

In column "b", for count "1" a two-part shaded area 720 includes the remainder data bits "z0"–"z6" (but not "z7") and the current data bits "a0", "a1" for a set of nine bits. This set is outputted on a count "1" by the (7:9) converter (FIG. 13) as a first outgoing (8:0) byte (not shown). Similarly, sets of bits in a two-part shaded area 721, and a two-part shaded area 722 are outputted as (8:0) bytes on counts "3" and "5" respectively. After count "5", there is an interval or count designated "EOP" ("extra no-operation") which is introduced to allow for sufficient additional bits to be inputted to the (7:9) converter. A reason for this was explained previously in connection with the bit chart 300 (FIG. 8) and will be further explained hereinafter. It is noted that in the bit chart 700, column "d", under "current data", the single bit "c6" is transferred during count "EOP", as indicated by an arrow 708, to the top of column "f" to an extra bit position (not otherwise designated). This will be further explained hereinafter. Thus in column "f" a nine bit set comprising "c6", "d0"–"d6", and "e0" are included within a two-part shaded area 723 and are outputted on a count "0". Columns "g", "h" and "i" show two-part shaded areas 724, 725 and 726 having sets of bits which are outputted as (8:0) bytes on respective counts "2", "4", "6". After a count "6" there is a "NOP" (no-operation) interval or count, which will also be further explained hereinafter.

In column "k" of the bit chart 700, the count sequence "1", "3", etc., is repeated, and so on. Two-part shaded areas 730–736 show respective sets of 9 bits each which are outputted on counts "1", "3", "5" "0", "2", "4", "6" as respective 9 bit bytes. Note again that the bits in positions "7" of remainder data, as well as bits in position "7" of current data have been eliminated from the outgoing 9-bit bytes. These extra bits (now removed) were previously in the incoming data stream for functions unrelated to the data bytes. The outgoing 9-bit bytes represented by the two part shaded areas of the bit chart 700 are recognizable as valid data by LINK/2 equipment.

Referring now to FIG. 13, there is shown in schematic circuit form a (7:9) bit converter 800. The converter 800 comprises a first (current data) flip flop 810, a second (remainder data) flip flop 812, a one-bit flip flop 813, a switch array of nine identical multiplex (MUX) units 816 designated: MUX "1"–MUX "9"; an output flip flop 817, a binary counter 820 and a control 822 for supplying an "EOP" count after a count "5" (see column "c"" of the bit chart 700) and a "NOP" count after a count "6" (see column "j" of the bit chart 700). The flip flop 810, 812, 813, and 817, the counter 820 and the control 822 are controlled by clock signals (not shown) applied to respective inputs (not shown) which are connected to a common clock-signal (CLK) lead 821. The MUXs 816 each have seven data bit inputs "D0"–"D6" and a single bit output "Y" designated respectively "0"–"8" for the MUXs 1–9. Each of these flip flops, counter, control and MUXs is well known in the art.

The first flip flop 810 receives as indicated by an arrow 802 from a source (not shown) incoming 8-bit parallel bytes as "current data" via an input buss 804 having 8 bit paths (7:0) in parallel. The 8 bits of each incoming byte (only 7 bits being actually used) are momentarily stored during each clock count in respective bit positions (not shown) within the flip flop 810. Respective bit outputs (not shown) of the flip flop 810 are coupled to a "current data" buss 824 having 8 parallel paths (7:0) The current data buss 824 is connected to 8 respective input bit positions (not shown) of the second flip flop 812. Various ones of the parallel paths (hereinafter designated "0"–"6") within the current data buss 824 are connected to selected ones of inputs designated "D0" to "D6" of the eight MUXs 816, as will presently be described in further detail.

The second flip flop 812 momentarily stores as "remainder data" the 8 bits of a byte transferred to it on each clock count from the current data flip flop 810. Selected bit outputs (eight in number) of the second flip flop 812 are respectively coupled to a "remainder data" buss 830 having 8 parallel paths (7:0) Various ones of seven parallel paths (hereinafter designated "R0"–"R6") within the buss 830 are connected to selected ones of the inputs "D0"–"D6" of the nine MUXs 816, as will presently be described in further detail. Path "R6" of the buss 830 is connected to a single input bit position (not shown) of the flip flop 813.

The counter 820 is a three-bit binary counter having bit outputs indicated at "Q0", "Q1" and "Q2" as shown. Each of these outputs "Q0". "Q1" and "Q2" (representing bits "0", "1", and "2") is respectively coupled to separate paths 836, 837 and 838, of a "count" buss 840. The paths 836, 837, 838 (representing respective bit positions "0", "1" and "2" of the counter 820) of the count buss 840 are coupled in transposed order to respective ones of clock-inputs "A", "B", "C", of the respective MUXs 816. Thus path 836 is coupled to inputs "C", the path 837 to inputs "A", and the path 838 to inputs "B" of the MUXs 816. Similarly, at a right end of the buss 840 the paths 836, 837, 838 are also connected in transposed order to respective bit positions "1", "2" and "0" of inputs (not shown) of the control 822.

Each of the nine MUXs 816 (MUX 1–9) has a single-bit output "Y" (designated respectively "0" for MUX 1, to "8" for MUX 9). Each output "Y" is coupled respectively to one of parallel bit paths 841–849 of a (8:0) data buss 850. A right end of the data buss 850 is connected to an input 852 of the flip flop 817, the separate paths 841–849 of the buss 850 being connected to respective input bit positions "0"–"8" (not shown) of the flip flop 817. An output 854 of the flip flop 817, with "0"–"8" parallel bit positions (not shown) is connected to an output (8:0) buss 856. The output buss 856 transmits parallel outgoing (8:0) bytes from the converter 800 in a direction indicated by an arrow 857 to a phasor (not shown).

The control 822, on receipt of a count "5" generates a delay of a full-count interval "t" (indicated at 65 in FIG. 4) and then generates a count "EOP" (see column "e" of the bit chart 700 of FIG. 12. During the counter "EOP", the control 822 applies an inhibit signal to a lead 860. The lead 860 is coupled to an input (designated CE) of the flip flop 817. When an inhibit signal is applied via the lead 860 to the flip flop 817, it is unable to accept data from the buss 850 and so no data i outputted to the buss 856 during a count "EOP".

Shortly before the beginning of a count "EOP", and before the end of a count "5", the control 822 generates a short duration "clock-skit" signal which it applies via a lead 862 to the counter 820. This clock-skip signal causes the next incoming clock signal to the counter 820 to be suppressed. The counter 820 therefore pauses at count "5" during a count "EOP", and on a next clock signal proceeds to a count "0" (see columns "e" and "e" of the bit chart 700 of FIG. 12).

The control 822 on receipt of a count "6" generates (after a full count "6" delay) a count "NOP" (see column "j" of the bit chart 700). During the count "NOP" the control 822 similarly applies another inhibit signal via the lead 860 to the flip flop 817, and before the end of the count "6" the control 822 generates another short duration "clock-skip" signal which it applies via the lead 862 to the counter 820. The counter 820 pauses during a count "NOP" and then proceeds to a count "1" (see columns "j" and "k" of the bit chart 700), and so on.

As seen in FIG. 13, each of the MUXs 816 is a seven-position switch. Counts "1", "3", "5", "0", "2", "4", "6", are applied to each MUX 816 at respective binary inputs "A", "B", "C" via the buss 840 from the counter 820. On a count "1" each bit input "D1" of each MUX 816 is connected to the respective output "Y"; on a count "3", bit input "D3" is connected to "Y"; on a count "5", input "D5" is connected to "Y"; on a count "0" input "D0" is connected to "Y"; on a count "2" input "D2" is connected to "Y"; on a count "4" input "D4" is connected to "Y"; and on a count "6" input "D6" is connected to "Y"; and so on count after count. It is noted that a single remainder data bit "R6" is applied via the buss 830 to an input (not shown) of the one-bit flip flop 813. An output (not shown) of the flip flop 813 is coupled via a lead 815 to the input "D0" of the first MUX 816. Before an "EOP" or a "NOP" count, a single bit (such as "c6" of column "j", or as bit "16" of column "m" of bit chart 700) is transferred on a count "5" to the remainder data flip flop 812 and during "EOP" or "NOP" then transferred to the flip flop 813 (as indicated by the arrows 708 of the bit chart 700). On a count "0" this bit (which is hereinafter designated single bit "SB") is outputted along with eight other bits of a set as shown by the respective two-part shaded areas 713, 733, etc. of the bit chart 700. Therefore, depending on which bit positions of the respective outputs of the current data flip flop 810, and the remainder data flip flop 812, are coupled (via the busses 824 and 830) to the sixty-three respective inputs "D0"–"D6", the nine MUXs 816 select clock count by clock count a desired set of nine bits of data (see the two part shaded areas of the bit chart 700 of FIG. 14) and apply them (at respective outputs "Y") in parallel to the buss 850 and the flip flop 817.

The following Table 4 shows permanent wiring connections within the converter 800 running according to predetermined patterns from output bit positions of the current data flip flop 810, of the remainder data flip flop 812, and of the flip flop 813 to respective ones of the sixty-three inputs "D0"–"D6" of the nine MUXs 816.

TABLE 4

| Row No. | Count No. | In-puts | MUX1 | MUX2 | MUX3 | MUX4 | MUX5 | MUX6 | MUX7 | MUX8 | MUX9 |
|---|---|---|---|---|---|---|---|---|---|---|---|
| 1 | 1 | D1 | R0 | R1 | R2 | R3 | R4 | R5 | R6 | 0 | 1 |
| 2 | 3 | D3 | R2 | R3 | R4 | R5 | R6 | 0 | 1 | 2 | 3 |
| 3 | 5 | D5 | R4 | R5 | R6 | 0 | 1 | 2 | 3 | 4 | 5 |
| 4 | 0 | D0 | SB | R0 | R1 | R2 | R3 | R4 | R5 | R6 | 0 |
| 5 | 2 | D2 | R1 | R2 | R3 | R4 | R5 | R6 | 0 | 1 | 2 |

TABLE 4-continued

| Row No. | Count No. | In-puts | MUX1 | MUX2 | MUX3 | MUX4 | MUX5 | MUX6 | MUX7 | MUX8 | MUX9 |
| --- | --- | --- | --- | --- | --- | --- | --- | --- | --- | --- | --- |
| 6 | 4 | D4 | R3 | R4 | R5 | R6 | 0 | 1 | 2 | 3 | 4 |
| 7 | 6 | D6 | R5 | R6 | 0 | 1 | 2 | 3 | 4 | 5 | 6 |

Table 4 is arranged in 12 vertical columns, with respective headings, and in 7 horizontal rows numbered 1–7. Note the transposed sequence of counts in the second column, and of the inputs in the third column. For simplicity of explanation, here (and in FIG. 13) 7 bit positions "R0"–"R6" (but not position "R7") of the remainder data flip flop 812 have been given alpha-numeric designations "R0"–"R6", and only the first 6 bit positions of the current data flip flop 810 have been given numeric-only designation "0"–"6". A single bit from the flip flop 813 is designated "SB" (see row 4, MUX 1)

Row 1 of the Table 4 shows that the input "D1" (column 3) of the MUX 1 (column 4) on a count "1" (column 2) is coupled to "R0" (bit position "0" of the remainder data flip flop 812). Similarly, input "D1" of MUX 2 is coupled to "R1" and so on across the row to "0" for MUX 8, and "1" for MUX 9. These connections are exactly the same as those shown in FIG. 13. Row 2 of the Table 4 similarly shows that the inputs "D3" of the nine MUXs 1–9 are coupled respectively to bit positions "R2"–"R6" of the remainder data flip flop 812, and to bit positions "0"–"3" of the current data flip flop 810. The Table 4 continues row by row to the seventh row and shows all of the connections to all of the sixty-three inputs "D0"–"D6" of the MUXs 1–9 (FIG. 13) from the flip flops 810, 812 and 813. These input connections (which are coupled in sets clock count by clock count to the outputs "Y" of the nine MUXs 1–9) are derived (predetermined by) from the bit chart 700 of FIG. 12. The bit chart 700 clearly shows (using equivalent terminology) the various connections listed in the Table 4. The two-part shaded areas 720, 721, 722, show bit sets corresponding respectively to those of rows 1, 2, 3 of Table 4; the two part shaded areas 723, 724, 725, 726, show bit sets corresponding to rows 4, 5, 6, 7, respectively.

Figure 14:
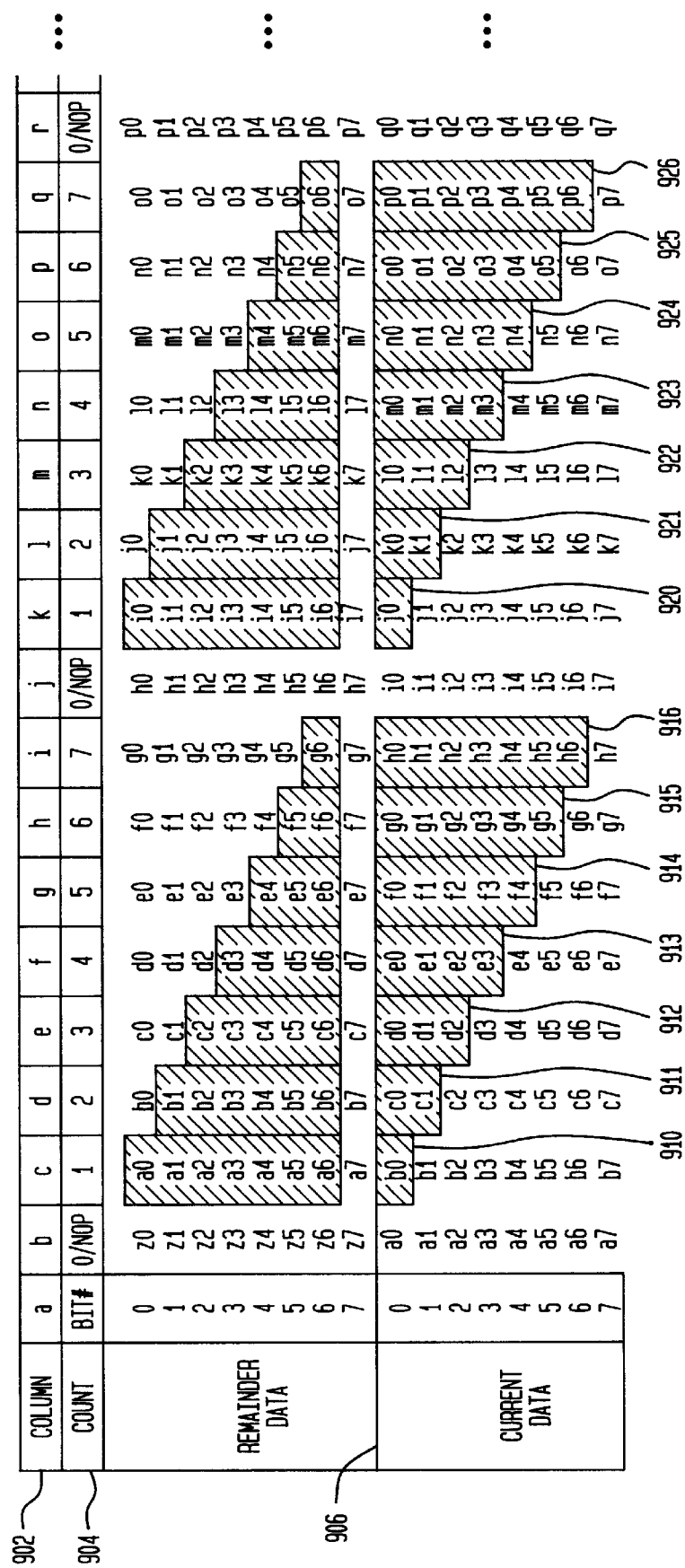
FIG. 14 is a bit chart representing a sequence of incoming 7-bit bytes being converted by a seven to eight (7:8) converter (shown in FIG. 14) into a sequence of outgoing 8-bit bytes.
Figure 15:
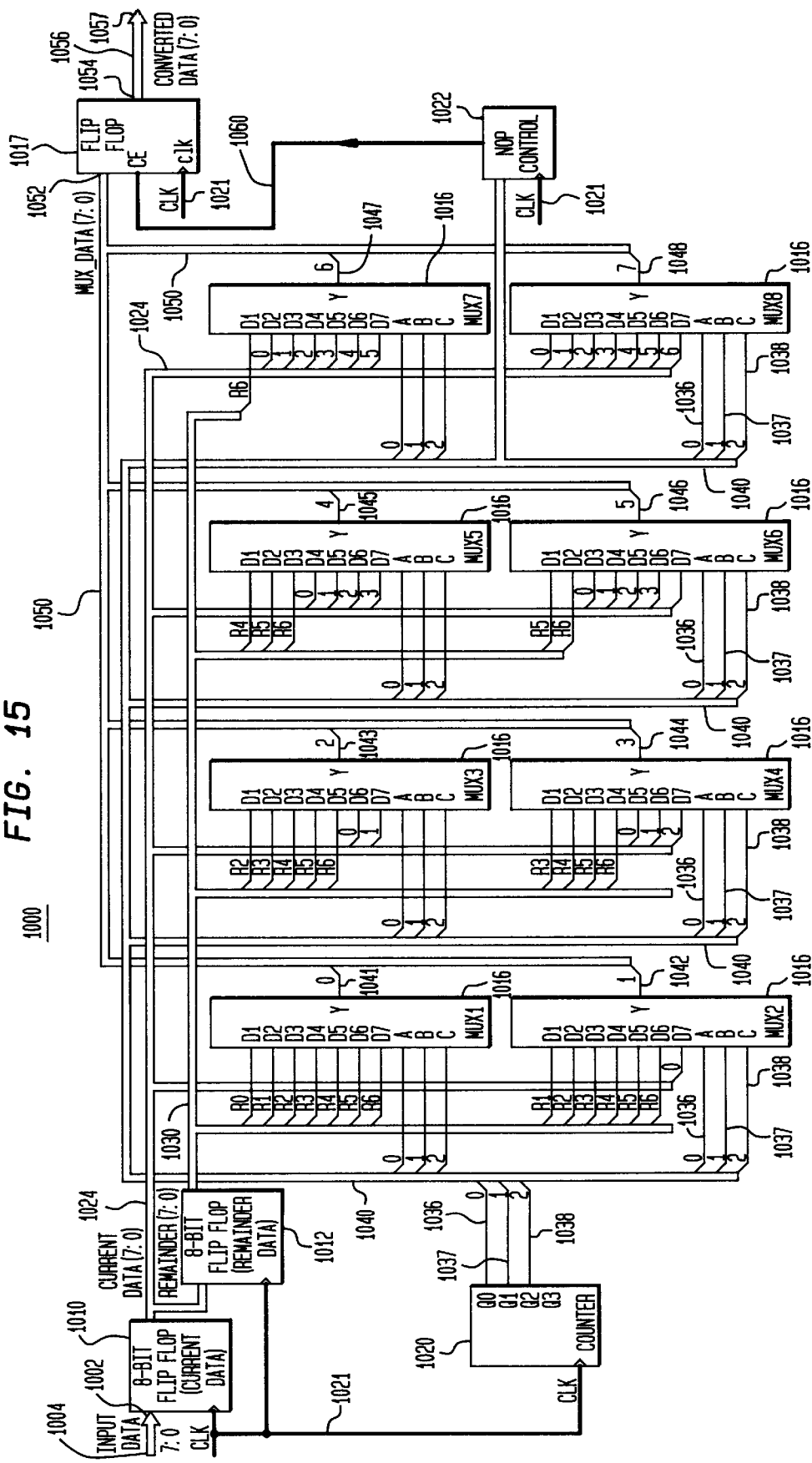
FIG. 15 is a schematic circuit diagram of a (7:8) converter (as represented by the bit chart of FIG. 14) also embodying features of the invention.

Referring now to FIG. 14, thee is shown a bit chart 900 which illustrates graphically how incoming 8-bit bytes (only seven of the bits being actually used) are converted to 8-bit bytes by a 7 bit to 8 bit (7:8) converter to be described shortly (FIG. 15). This bit chart is easily understood from the explanations given previously in connection with the bit charts of FIGS. 5, 8, 10, and 12 and from the following description. The bit chart 900 of FIG. 14 is arranged in vertical columns designated by headings "a", "b", "c", etc., in a top horizontal row indicated at 902. Beneath this row is another row indicated at 904, showing sequential counts "0/NOP", "1", "2", "3", "4" "5", "6", "7", and then (at column "j") repeating "0/NOP", "1", "2", etc. In column "a" of the bit chart 900 there are eight bit positions "0"–"7" designated "remainder data" and, below a horizontal line 906, eight bit positions "0"–"7" designated "current data". These bit positions represent respective positions of the bits in successive incoming 8-bit bytes (only seven of which bits are actually used).

In column "b", for a count "0/NOP" there are shown current data bits "a0"–"a7" but no bits (only bit positions "1"–"7") are shown as "remainder data" since it is assumed that a byte "a" is the first one inputted. After being transferred from "current data" to "remainder data" (column "c") the bits "a0"–"a6", but not "a7", and a bit "b0" under "current data" are outputted as an eight bit set on a count "1" by the (7:8) converter (FIG. 15) as a first outgoing (7:0) byte (not shown). This is represented by a two part shaded area 910 of column "c". Similarly, sets of bits in respective two-part shaded area 911–916, are outputted as (7:0) bytes on successive counts "2", "3", "4", "5", "6" and "7". After count "7", there is another count "0/NOP" (column "j") which is introduced to allow for sufficient additional bits to be inputted to the (7:8) converter. A reason for this was explained previously in connection with the bit chart 300 (FIG. 8) and will be further explained hereinafter.

In column "j" of the bit chart 900, the count sequence "0/NOP", "1", "2", "3", etc., is repeated, and so on. Two-part shaded areas 920–926 show respective sets of 8 bits each which are outputted on counts "1", "2", "3", etc., as seven respective 8 bit bytes. Note again that the bits in position "7" of remainder data, as well as bits in position "7" of current data have been eliminated from the outgoing 8-bit bytes. These extra bits (now removed) were previously in the incoming data stream for functions unrelated to the data bytes.

Referring now to FIG. 15, there is shown in schematic circuit form a (7:8) converter 1000. The converter 1000 comprises a first (current data) flip flop 1010, a second (remainder data) flip flop 1012, a switch array of eight identical multiplex (MUX) units 1016 designated: MUX "1"–MUX "8"; an output flip flop 1017, a binary counter 1020 and a control 1022 for supplying a "0/NOP" count after a count "7" (see column "j" of the bit chart 900). The flip-flops 1010, 1012, and 1017, the counter 1020 and the control 1022 are controlled by clock signals (not shown) applied to respective inputs (not shown) which are connected to a common clock-signal (CLK) lead 1021. The MUXs 1016 each have seven data bit inputs "D1"–"D7" (but not "D0") and a single bit output "Y" designated respectively "0"–"7" for the MUXs 1–8. Each of these flip flops, counter, control and MUXs is well known in the art.

The first flip flop 1010 receives as indicated by an arrow 1002 from a source (not shown) incoming 8-bit parallel bytes as "current data" via an input buss 1004 having 8 bit paths (7:0) in parallel. The 8 bits of each incoming byte (only 7 bits being actually used) are momentarily stored during each clock count in respective bit positions (not shown) within the flip flop 1010. Respective bit outputs (not shown) of the flip flop 1010 are coupled to a "current data" buss 1024 having 8 parallel paths (7:0). The current data buss 1024 is connected to 8 respective input bit positions (not shown) of the second flip flop 1012. Various ones of parallel paths (hereinafter designated "0"–"6") within the current data buss 1024 are connected to selected ones of inputs designated "D1" to "D7" of the eight MUXs 1016, as will presently be described in further detail.

The second flip flop 1012 momentarily stores as "remainder data" the 8 bits of a byte transferred to it on each clock count from the current data flip flop 1010. Selected bit outputs (eight in number) of the second flip flop 1012 are respectively coupled to a "remainder data" buss 1030 having 8 parallel paths (7:0) Various ones of seven parallel paths (hereinafter designated "R0"–"R6") with the buss 1030 are connected to selected ones of the inputs "D1"–"D7" of the eight MUXs 1016, as will presently be described in further detail. Note that remainder data bit "R7" is never used.

The counter 1020 is a three-bit binary counter having bit outputs indicated at "Q0", "Q1" and "Q2" as shown. Each of these outputs "Q0", "Q1" and "Q2" (representing bits "0", "1", and"2") is respectively coupled to separate paths 1036, 1037 and 1038, of a "count" buss 1040. The paths 1036, 1037, 1038 (representing respective bit positions "0", "1" and "2" of the counter 1020) of the count buss 1040 are coupled to respective ones of clock-inputs "A", "B", "C" of the respective MUXs 1016. Thus path 1036 is coupled to inputs "A", the path 1037 to inputs "B", and the path 1038 to inputs "C" of the MUXs 1016. Similarly, at a right end of the buss 1040 the paths 1036, 1037, 1038 are also connected in sequence to respective bit positions "0", "1" and "2" of inputs (not shown) of the control 1022.

Each of the eight MUXs 1016 (MUX 1–8) has a single-bit output "Y" (designated respectively "0" for MUX 1, to "7" for MUX 8). Each output "Y" is coupled respectively to one of parallel bit paths 1041–1048 of a (7:0) data buss 1050. A right end of the data buss 1050 is connected to an input 1052 of the flip flop 1017, the separate paths 1041–1048 of the buss 1050 being connected to respective input bit positions "0"–"7" (not shown) of the flip flop 1017. An output 1054 of the flip flop 1017, with "0"–"7" parallel bit positions (not shown) is connected to an output (7:0) buss 1056. The output buss 1056 transmits parallel outgoing (7:0) bytes from the converter 1000 in a direction indicated by an arrow 1057 to a phasor (not shown).

The control 1022, on receipt of a count "0" from the counter 1020 generates an inhibit signal which it applies to a lead 1060. The lead 1060 is coupled to an input (designated CE) of the flip flop 1017. When an inhibit signal is applied via the lead 1060 to the flip flop 1017, it is unable to accept data from the buss 1050 and so no data is outputted to the buss 1056 during a count "0/NOP".

As seen in FIG. 15, each of the MUXs 1016 is a seven-position switch. Counts "0/NOP", "1", "2", "3", "4", "5", "6", and "7" are applied to each MUX 1016 at respective binary inputs "A", "B", "C" via the buss 1040 from the counter 1020. On a count "1" each bit input "D1" of each MUX 1016 is connected to the respective output "Y"; on a count "2" bit input "D2" is connected to "Y"; on a count "3", bit input "D3" is connected to "Y"; on a count "4", input "D4" is connected to "Y"; on a count "5" input "D5" is connected to "Y"; on a count "6" input "D6" is connected to "Y"; and on a count "7" input "D7" is connected to "Y"; and so on count after count. Therefore, depending on which bit positions of the respective outputs of the current data flip flop 1010, and the remainder data flip flop 1012, are coupled (via the busses 1024 and 1030) to the fifty-six respective inputs "D1"–"D7", the eight MUXs 1016 select clock count by clock count a desired set of eight bits of data (see the two part shaded areas of the bit chart 900 of FIG. 14) and apply them (at respective outputs "Y") in parallel to the buss 1050 and the flip flop 1017.

The following Table 5 shows permanent wiring connections within the converter 1000 running according to predetermined patterns from output bit positions of the current data flip flop 1010, of the remainder data flip flop 1012, to respective ones of the fifty-six inputs "D1"–"D7" of the eight MUXs 1016.

TABLE 5

| Row No. | Count No. | In-puts | MUX1 | MUX2 | MUX3 | MUX4 | MUX5 | MUX6 | MUX7 | MUX8 |
|---|---|---|---|---|---|---|---|---|---|---|
| 1 | 1 | D1 | R0 | R1 | R2 | R3 | R4 | R5 | R6 | 0 |
| 2 | 2 | D2 | R1 | R2 | R3 | R4 | R5 | R6 | 0 | 1 |
| 3 | 3 | D3 | R2 | R3 | R4 | R5 | R6 | 0 | 1 | 2 |
| 4 | 4 | D4 | R3 | R4 | R5 | R6 | 0 | 1 | 2 | 3 |
| 5 | 5 | D5 | R4 | R5 | R6 | 0 | 1 | 2 | 3 | 4 |
| 6 | 6 | D6 | R5 | R6 | 0 | 1 | 2 | 3 | 4 | 5 |
| 7 | 7 | D7 | R6 | 0 | 1 | 2 | 3 | 4 | 5 | 6 |

Table 4 is arranged in 11 vertical columns, with respective headings, and in 7 horizontal rows numbered 1–7. Note the straight sequence of counts in the second column, and of the inputs in the third column (no count "0", and no input "D0"). For simplicity of explanation, here (and in FIG. 15) 7 bit positions "R0"–"R6" (but not position "R7") of the remainder data flip flop 1012 have been given alpha-numeric designations "R0"–"R6", and only the first 6 bit positions of the current data flip flop 1010 have been given numeric-only designation "0"–"6".

Row 1 of the Table 5 shows the input "D1" (column 3) of the MUX 1 (column 4) on a count "1" (column 2) is coupled to "R0" (bit position "0" of the remainder data flip flop 812). Similarly, input "D1" of MUX 2 is coupled to "R1" and so on across the row to "0" for MUX 8. These connections are exactly the same as those shown in FIG. 15. The Table 5 continues row by row to the seventh row and shows all of the connections to all of the fifty-six inputs "D1"–"D7" of the MUXs 1–8 (FIG. 15) from the flip flops 1010 and 1012. These input connections (which are coupled in sets clock count by clock count to the outputs "Y" of the eight MUXs 1–8) are derived (predetermined by) from the bit chart 900 of FIG. 14. The bit chart 900 clearly shows (using equivalent terminology) the various connections listed in the Table 5. The two-part shaded areas 910–916 and 920–926 show bit sets corresponding respectively to those of rows 1, 2, 3, 4, 5, 6, 7 of Table 5.

It will now be appreciated that the five bit charts of FIGS. 5, 8, 10, 12 and 14 illustrate general principles of the invention along with specific details pertinent to each bit chart and its associated converter (see respective FIGS. 6, 9, 11, 13 and 15). The various bits of incoming bytes (having a given number of bits) are momentarily stored in bit positions in memory as "current data" and as "remainder data". On each outgoing count a set of bits (either greater or smaller in number than the given number) which are then stored as current data, remainder data, or both is outputted as an outgoing byte. Each such set of bits (represented by corresponding shaded areas in the bit charts) is predetermined by sets of paths from the memory bit positions to inputs of switching means (MUXs) which on each count connect the inputs in a desired sequence to an output where each set of bits is applied in parallel as an outgoing byte. This continues count after count until the last incoming byte is converted. Compensation is periodically made to equalize the total number of outgoing bits with the total number of incoming bits during an elapsed time interval The sets of bits which become the outgoing bytes are processed "on-the-fly" virtually instantaneously so that there is no queuing of data. Each outgoing bit corresponds exactly to its incoming counterpart and absolute accuracy in the conversion of bytes is obtained. In specific embodiments of the invention the respective bit charts show how incoming 9 bit bytes are converted to outgoing 8 bit bytes (FIG. 5), how 8 bit bytes are converted to 9 bit bytes (FIG. 8), how 9 bit bytes are converted to 7 bit bytes (FIG. 10), how 7 bit bytes are converted to 9 bit bytes (FIG. 12), and how 7 bit bytes are converted to 8 bit bytes (FIG. 14).

The converters of FIGS. 6, 9, 11, 13 and 15 are constructed from elements well known in the art. Thus, the various MUXs of the converters are readily assembled from individual "gate" elements in a field programmable gate array (FPGA). An FPGA is commercially available from several manufacturers as an integrated circuit (IC) containing thousands of individual gates. A single FPGA integrated circuit is easily connected internally, as is well known in the art, to provide for all of the MUXs (and associated inputs and output connections) for all of the converters disclosed herein. The cost of "hardware" for all of these converters is therefore kept low.

It is to be understood that various changes or modifications in the apparatus and method of the invention as set forth may occur to those skilled in the art, and these may be made without departing from the spirit and scope of the invention as defined by the accompanying claims.

What is claimed is:

1. A method of continually converting in real time incoming parallel bytes having a given number of bits into outgoing parallel bytes having a different number of bits comprising the steps of:

momentarily storing clock count by clock count as current data and as remainder data respective bits of successive incoming bytes each having a given number of bits;

selecting clock count by clock count respective ones of bits stored as current data or as remainder data, or both and grouping the bits selected each count into a set having a different number of bits from the number in each incoming byte;

outputting clock count by clock count the selected sets of bits as outgoing bytes;

periodically compensating for the number of bits outputted versus the number of bits inputted during a given time interval; and transmitting the converted bytes to a buffer memory and from thence to another location.

2. Apparatus enabling unimpeded communication of data bytes clock-to-clock between different classes of equipment utilizing different byte protocols, the apparatus comprising:

a first group of units of a first class of equipment utilizing bytes of "m" number of bits in its operating protocol;

a second group of units of a second class of equipment utilizing bytes of "n" number of bits in its operating protocol;

a plurality of byte converters associated with one or more of the units for converting clock-to-clock and without queuing bytes of "m" bits to bytes of "n" bits, and for similarly converting bytes of "n" bits to bytes of "m" bits;

means for coupling bytes outputting from each converter to a respective buffer memory phasor thereby providing flexibility in timing as the converted bytes are transmitted to other locations; and communication links coupling units in the first and second groups together such that the groups of units of both classes are connected in a global network in which any unit can communicate unimpeded in real time with any other unit or units.

3. The apparatus of claim 2 wherein each converter comprises:

first and second memory means for momentarily storing in bit positions clock count by clock count respective bits of successive incoming bytes as current data and as remainder data, the first and second memory means having respective output bit positions, the first and second memory means having respective inputs, inputs of the first memory means being coupled to receive respective bits of incoming bytes clock count by clock count, output bit positions of the first memory means being coupled to inputs of the second memory means;

switch means, having a plurality of outputs and having multiple inputs respective to each output, for switching clock count by clock count selected ones of the inputs to the plurality of outputs, the multiple inputs being coupled to selected ones of output positions of the first and second memory means;

output means, having a plurality of input bit positions, for outputting clock count by clock count bytes each having a different number of bits from the number in each incoming byte, the input bit positions of the output means being coupled to respective ones of the plurality of outputs of the switch means;

counter means coupled to the switch means for controlling clock count by clock count the switching of inputs to outputs of the switch means; and control means, having an input coupled to the counter means and an output coupled to the output means, for periodically equalizing the total number of bits outputted as bytes by the output means within a given interval of time with the total number of bits inputted as bytes to the first and second memory means during the given time, such that the incoming bytes are almost instantly converted clock count by clock count to outgoing bytes and the bits of the outgoing bytes are in a desired numerical sequence.

4. The apparatus of claim 3 wherein the number of "m" bits is 9 and the number of "n" bits is 8.

5. Apparatus enabling unimpeded communication of data bytes clock-to-clock between and amongst different classes of equipment utilizing different bytes protocols, the apparatus comprising:

a first group of units of a first class of equipment utilizing bytes of 9 bits in its operating protocol;

a second group of units of a second class of equipment utilizing bytes of 8 bits in its operating protocol;

a plurality of byte converters associated with one or more of the units of the second class for converting clock-to-clock and without queuing bytes of 9 bits to bytes of 8 bits, and for similarly converting bytes of 8 bits to bytes of 9 bits;

means for coupling bytes outputted from each converter to a respective buffer memory phasor thereby providing flexibility in timing as the converted bytes are transmitted to other locations; and communication links coupling units in the first and second groups together such that the groups of units of both classes are connected in a global network in which any unit can communicate unimpeded in real time with any other unit or units.

6. The apparatus of claim 5 wherein the plurality of byte converters comprises a converter from 9 to 8 bits, a converter from 8 to 9 bits, a converter from 9 to 7 bits, a converter from 7 to 9 bits and a converter from 7 to 8 bits.

7. A method of continually converting in real time incoming parallel data bytes into outgoing parallel data bytes comprising the steps of:

momentarily storing as current data and as remainder data respective bits of successive incoming bytes clock count by clock count;

identifying within each count a desired number of bits stored as remainder data, or current data, or both and grouping them into a set of bits to be outputted as an outgoing byte during a respective count;

periodically compensating for the total number of bits outputted versus the number inputted during a given period of time; and outputting such sets of bits to a buffer memory phasor clock count by clock count as outgoing bytes for transmission to another location such that the outgoing bytes each have a different number of bits versus the number of bits in each incoming byte, and the outgoing bits have a desired numerical sequence.

8. The method of claim 7 further comprising the steps of:

reconverting the converted bytes to subsequent bytes having the same number of bits and bit sequence as the incoming bytes; and transmitting the subsequent bytes to another location.

9. The method of claim 8 wherein the incoming bytes have 9 bits each and are converted to bytes of 8 bits each, and the subsequent bytes have 9 bits each.

* * * * *